(12) United States Patent
Park et al.

(10) Patent No.: US 11,038,613 B2
(45) Date of Patent: *Jun. 15, 2021

(54) SIGNAL TRANSMISSION/RECEPTION METHOD BETWEEN TERMINAL AND BASE STATION IN WIRELESS COMMUNICATION SYSTEM SUPPORTING NARROWBAND INTERNET OF THINGS, AND DEVICE SUPPORTING SAME

(71) Applicant: LG Electronics Inc., Seoul (KR)

(72) Inventors: Changhwan Park, Seoul (KR); Joonkui Ahn, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,592

(22) Filed: Feb. 13, 2020

(65) Prior Publication Data

US 2020/0186271 A1 Jun. 11, 2020

Related U.S. Application Data

(63) Continuation of application No. 16/543,119, filed on Aug. 16, 2019, which is a continuation of application No. PCT/KR2018/002015, filed on Feb. 19, 2018.

(Continued)

(51) Int. Cl.
*H04J 11/00* (2006.01)
*H04J 3/06* (2006.01)
(Continued)

(52) U.S. Cl.
CPC ......... *H04J 11/0076* (2013.01); *H04J 3/0697* (2013.01); *H04L 5/005* (2013.01);
(Continued)

(58) Field of Classification Search
CPC ... H04L 5/0053; H04L 5/0007; H04L 5/0048; H04L 5/0005; H04W 4/70;
(Continued)

(56) References Cited

U.S. PATENT DOCUMENTS

2010/0260156 A1 10/2010 Lee et al.
2010/0322169 A1* 12/2010 Narasimha ........ H04W 72/0493
370/329

(Continued)

FOREIGN PATENT DOCUMENTS

CN 103299563 9/2013
IN 201641026407 8/2016

(Continued)

OTHER PUBLICATIONS

MCC TF160, "NB-IoT—System Information Scheduling," R5w160307, 3GPP TSG-RAN WG5—SS Vendors / MCC TF160 Workshop-IoT #1, Sophia-Antipolis, France, Sep. 27, 2016, 7 pages.

(Continued)

*Primary Examiner* — Christopher M Crutchfield
(74) *Attorney, Agent, or Firm* — Fish & Richardson P.C.

(57) ABSTRACT

Disclosed are a signal transmission/reception method between a terminal and a base station in a wireless communication system supporting narrowband Internet of Things (NB-IoT), and a device supporting same. More specifically, disclosed is a description of a signal transmission/reception method between a terminal and a base station when a wireless communication system supporting NB-IoT is a time division duplex (TDD) system.

14 Claims, 19 Drawing Sheets

Related U.S. Application Data

(60) Provisional application No. 62/547,768, filed on Aug. 19, 2017, provisional application No. 62/460,103, filed on Feb. 17, 2017.

(51) Int. Cl.
| | |
|---|---|
| *H04W 56/00* | (2009.01) |
| *H04W 72/04* | (2009.01) |
| *H04L 5/00* | (2006.01) |
| *H04W 4/60* | (2018.01) |
| *H04W 92/10* | (2009.01) |

(52) U.S. Cl.
CPC ............ *H04L 5/0053* (2013.01); *H04W 4/60* (2018.02); *H04W 56/0015* (2013.01); *H04W 72/0446* (2013.01); *H04W 92/10* (2013.01)

(58) Field of Classification Search
CPC ........... H04W 72/0446; H04W 56/001; H04W 56/00; H04W 48/16
See application file for complete search history.

(56) References Cited

U.S. PATENT DOCUMENTS

| | | | |
|---|---|---|---|
| 2015/0296518 A1 | 10/2015 | Yi et al. | |
| 2016/0262123 A1 | 9/2016 | Abedini et al. | |
| 2016/0374109 A1* | 12/2016 | Rico Alvarino | ....... H04H 20/16 |
| 2017/0033912 A1 | 2/2017 | Onggosanusi et al. | |
| 2017/0135052 A1 | 5/2017 | Lei | |
| 2017/0311250 A1* | 10/2017 | Rico Alvarino | ...... H04W 48/18 |
| 2017/0317816 A1 | 11/2017 | Lei | |
| 2018/0097596 A1 | 4/2018 | Palanivelu | |
| 2018/0234169 A1* | 8/2018 | Sridharan | ................ H04L 5/143 |
| 2018/0262975 A1 | 9/2018 | Martinez Tarradell | |
| 2019/0007893 A1 | 1/2019 | Thangarasa | |
| 2019/0165922 A1 | 5/2019 | Chavva | |
| 2019/0320430 A1* | 10/2019 | Kim | ..................... H04W 72/048 |
| 2020/0169980 A1* | 5/2020 | Du | ......................... H04W 48/12 |

FOREIGN PATENT DOCUMENTS

| | | | |
|---|---|---|---|
| IN | 201641033621 | | 9/2016 |
| IN | 20171005220 | * | 2/2017 |
| WO | WO2017019133 | | 2/2017 |
| WO | WO2018190620 | | 10/2018 |
| WO | WO2019032845 | | 2/2019 |

OTHER PUBLICATIONS

Nokia Networks, Alcatel-Lucent, Alcatel-Lucent Shanghai Bell, "SIB transmission for NB-IoT," R1-160452, 3GPP TSG-RAN WG1 Meeting #84, St. Julian's, Malta, Feb. 15-19, 2016, 3 pages.
Wang et al., "A Primer on 3GPP Narrowband Internet of Things (NB-IoT)," Networking and Internet Architecture, dated Jun. 13, 2016, 8 pages.
Gemalto, "Support of Paging Transmission and NPRACH on Non-Anchor PRB," R2-164780, 3GPP TSG-RAN Meeting #95, Gothenburg, Sweden, dated Aug. 22-26, 2016, 1 page.
Seo et al., "Trends of NB-IoT," Electronics and the Telecommunications Trends, vol. 31, Issue 5 (vol. 161), dated Oct. 1, 2016, 18 pages.
PCT International Search Report and Written Opinion in International Application No. PCT/KR2018/002015, dated May 15, 2018, 16 pages (with English translation).
Author Unknown, SS block design, Doc. No. R1-1701572, Feb. 17, 2017, pp. 1-12 (Year: 2017).
Author Unknown, NR-SS: Periodicity, Doc. No. R1-1701575, Feb. 17, 2017, pp. 1-3) (Year: 2017).
Author Unknown, On the performance of MIB-NB and SIB1-NB acquisition, Doc. No. RI-1701895, Feb. 17, 2017, pp. 1-6 (Year: 2017).
Author Unknown, Considerations on SS Bandwidth and Multiplexing, Doc. No. R1-1702314, Feb. 17, 2017, pp. 1-6 (Year: 2017).
Author Unknown, SS Periodicity, Doc. No. R1-1702903, Feb. 17, 2017, pp. 1-7 (Year: 2017).
Nokia Networks, "On the synchronization signal design for NB-IoT," R1-157274, 3GPP TSG-RAN WG1 Meeting #83, Anaheim, USA, dated Nov. 15-22, 2015, 9 pages.
Chinese Office Action in Chinese Application No. 201880012342.1, dated Jun. 20, 2020, 16 pages (with English translation).
Qualcomm Incorporated, "System information and paging," R1-163012, 3GPP TSG RAN1 #84-BIS, Busan, South Korea, dated Apr. 11-15, 2016, 5 pages.
ZTE, "Simulation results for RRM measurement for standalone NB-IoT," R4-168153, 3GPP TSG-RAN WG4 Meeting #80bis, Ljubljana, Slovenia, dated Oct. 10-14, 2016, 4 pages.
Extended European Search Report in European Application No. 18754520.7, dated Nov. 17, 2020, 12 pages.
Intel Corporation, "Design of synchronization signals and system information for TDD support in feNB-loT," R1-1712504, 3GPP TSG RAN WG1 Meeting #90, Prague, Czech Republic, dated Aug. 21-25, 2017, 4 pages.
Intel Corporation, "On improving SI8/MIB acquisition time in eNB-loT," R1-1702707, 3GPP TSG RAN WG1 Meeting #88, Athens, Greece, dated Feb. 13-17, 2017, 6 pages.
Japanese Office Action in Japanese Application No. 2019-544609, dated Sep. 29, 2020, 8 pages (with English translation).
LG Electronics, "Discussion on multiple PRB operation for SIB1 transmission," R1-160615, 3GPP TSG RAN1 #84, 3GPP TSG RAN1 #84, dated Feb. 15-19, 2016, 3 pages.
Samsung, "Narrowband IOT—Synchronization Design," R1-155509, 3GPP TSG RAN WG1 Meeting #82bis, Malmo, Sweden, dated Oct. 5-9, 2015, 6 pages.
ZTE, "Remaining issues for Paging in NB-IoT," R2-162359, 3GPP TSG-RAN WG2 Meeting, Dubrovnik, Croatia, dated Apr. 11-15, 2016, 5 pages.
JP Final Office Action in Japanese Appln. No. 2019-544609, dated Jan. 19, 2021, 6 pages (with English translation).
LTE; Evolved Universal Terrestrial Radio Access (E-UTRA), "LTE physical layer; General description (3GPP TS 36.201 version 14.1.0 Release 14)," ETSI TS 136 201 V14.1.0, dated Apr. 2017, 17 pages.

* cited by examiner

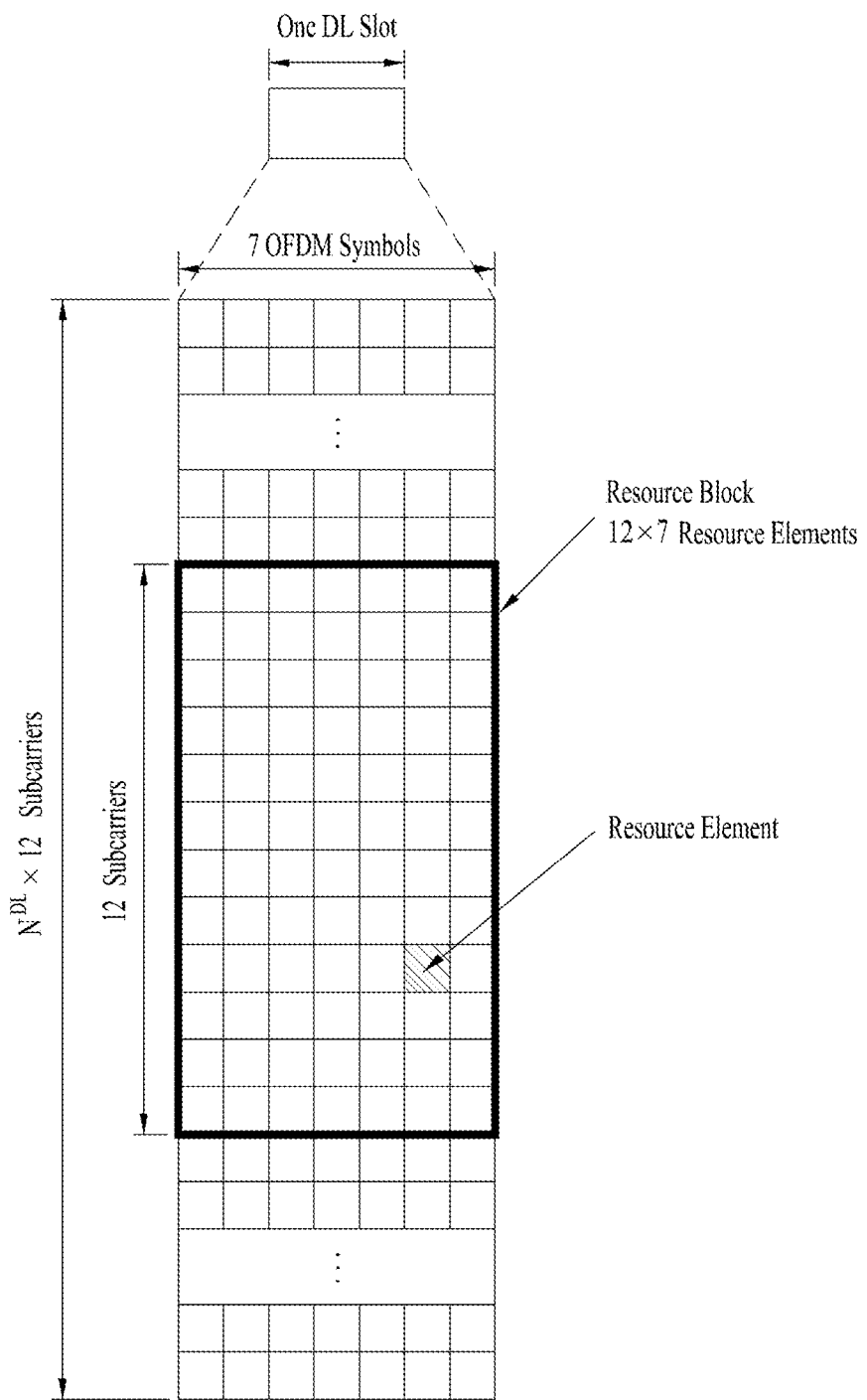

SIGNAL TRANSMISSION/RECEPTION METHOD BETWEEN TERMINAL AND BASE STATION IN WIRELESS COMMUNICATION SYSTEM SUPPORTING NARROWBAND INTERNET OF THINGS, AND DEVICE SUPPORTING SAME

CROSS-REFERENCE TO RELATED APPLICATIONS

This application is a continuation of U.S. application Ser. No. 16/543,119, filed on Aug. 16, 2019, which is a continuation of International Application No. PCT/KR2018/002015, filed on Feb. 19, 2018, which claims the benefit of U.S. Provisional Application No. 62/547,768, filed on Aug. 19, 2017, and U.S. Provisional Application No. 62/460,103, filed on Feb. 17, 2017. The disclosures of the prior applications are incorporated by reference in their entirety.

TECHNICAL FIELD

The following description relates to a wireless communication system, and more particularly, to a signal transmission/reception method between a terminal and a base station in a wireless communication system supporting Narrowband Internet of Things (NB-IoT), and devices supporting the same.

More specifically, in the following description includes description of a method of transmitting and receiving signals between a terminal and a base station when a wireless communication system supporting the Narrowband Internet of Things (NB-IoT) is a time division duplex (TDD) system.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In particular, Internet of Things (IoT) communication technology is newly proposed. Here, IoT refers to communication that does not involve human interaction. A way to introduce such IoT communication technology in a cellular-based LTE system is further under discussion.

The conventional Long Term Evolution (LTE) system has been designed to support high-speed data communication and thus has been regarded as an expensive communication technology for people.

However, IoT communication technology can be widely used only if the cost is reduced.

There have been discussions about reducing the bandwidth as a way to reduce cost. However, to reduce the bandwidth, a new frame structure should be designed in the time domain, and the issue of interference with the existing neighboring LTE terminals should also be considered.

SUMMARY

An object of the present invention is to provide a method for transmitting/receiving a synchronization signal between a terminal and a base station in a wireless communication system supporting narrowband Internet of Things.

In particular, an object of the present invention is to provide a method for transmitting/receiving a synchronization signal between a terminal and a base station when the wireless communication system is a TDD system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method and devices for transmitting/receiving signals between a terminal and a base station in a wireless communication system supporting narrowband Internet or Things.

In one aspect of the present invention, provided herein is a method of receiving, by a terminal, a signal from a base station in a wireless communication system supporting Narrow Band-Internet of Things (NB-IoT), the method including receiving a Narrowband Primary Synchronization Signal (NPSS) and a Narrowband Secondary Synchronization Signal (NSSS) through a first carrier during different sub-time intervals, wherein one time interval includes a plurality of sub-time intervals, wherein the NPSS is received during an X-th (where X is a natural number) sub-time interval in every time interval, and the NSSS is received during a Y-th (where Y is a natural number) sub-time interval in a corresponding time interval with a periodicity of two time intervals; and receiving System Information Block 1-Narrow Band (SIB1-NB) through a second carrier different from the first carrier during a Y-th sub-time interval in a corresponding time interval with a periodicity of one or more time intervals.

In another aspect of the present invention, provided herein is a method of transmitting, by a base station, a signal to a terminal in a wireless communication system supporting Narrow Band-Internet of Things (NB-IoT), the method including transmitting a Narrowband Primary Synchronization Signal (NPSS) and a Narrowband Secondary Synchronization Signal (NSSS) through a first carrier during different sub-time intervals, wherein one time interval includes a plurality of sub-time intervals, wherein the NPSS is transmitted during an X-th (where X is a natural number) sub-time interval in every time interval, and the NSSS is transmitted during a Y-th (where Y is a natural number) sub-time interval in a corresponding time interval with a periodicity of two time intervals; and transmitting System Information Block 1-Narrow Band (SIB1-NB) through a second carrier different from the first carrier during a Y-th sub-time interval in a corresponding time interval with a periodicity of one or more time intervals.

In another aspect of the present invention, provided herein is a terminal for receiving a signal from a base station in a wireless communication system supporting Narrow Band-Internet of Things (NB-IoT), the terminal including a receiver; and a processor operatively coupled to the receiver, wherein the processor is configured to receive a Narrowband Primary Synchronization Signal (NPSS) and a Narrowband Secondary Synchronization Signal (NSSS) through a first carrier during different sub-time intervals, wherein one time interval includes a plurality of sub-time intervals, wherein the NPSS is received during an X-th (where X is a natural number) sub-time interval in every time interval, and the NSSS is received during a Y-th (where Y is a natural number) sub-time interval in a corresponding time interval with a periodicity of two time intervals; and receive System Information Block 1-Narrow Band (SIB1-NB) through a second carrier different from the first carrier during a Y-th sub-time interval in a corresponding time interval with a periodicity of one or more time intervals.

In another aspect of the present invention, provided herein is a base station for transmitting a signal to a terminal in a wireless communication system supporting Narrow Band-Internet of Things (NB-IoT), the base station including a transmitter; and a processor operatively coupled to the transmitter.

The processor is configured to transmit a Narrowband Primary Synchronization Signal (NPSS) and a Narrowband Secondary Synchronization Signal (NSSS) through a first carrier during different sub-time intervals, wherein one time interval includes a plurality of sub-time intervals, wherein the NPSS is transmitted during an X-th (where X is a natural number) sub-time interval in every time interval, and the NSSS is transmitted during a Y-th (where Y is a natural number) sub-time interval in a corresponding time interval with a periodicity of two time intervals; and transmit System Information Block 1-Narrow Band (SIB1-NB) through a second carrier different from the first carrier during a Y-th sub-time interval in a corresponding time interval with a periodicity of one or more time intervals.

Herein, the first carrier may correspond to an anchor-carrier, and the second carrier may correspond to a non-anchor carrier.

In addition, X and Y may be set to different values.

The one time interval may be one radio frame, and each of the sub-time intervals may be one subframe, wherein the radio frame may include 10 subframes.

In this case, X may be 6, and Y may be 1.

The periodicity of one or more time intervals for transmitting the SIB1-NB may correspond to a periodicity of two time intervals or a periodicity of four time intervals.

The SIB1-NB may be received through the second carrier during the Y-th sub-time interval in a time interval in which the NSSS is not transmitted.

The wireless communication system may be a time division duplex (TDD) system.

In this case, when the wireless communication system is a TDD system defined in a 3GPP Long Term Evolution (LTE) system, the wireless communication system may not support uplink/downlink configuration 0 for one radio frame defined in the 3GPP LTE system.

It is to be understood that both the foregoing general description and the following detailed description of the present disclosure are exemplary and explanatory and are intended to provide further explanation of the disclosure as claimed.

As is apparent from the above description, the embodiments of the present invention have the following effects.

According to embodiments of the present invention, a terminal and a base station may transmit and receive NPSS and NSSS through an anchor carrier, while transmitting and receiving signals through a non-anchor carrier in SIB1-NB.

In particular, in the case of the LTE TDD system, it is difficult for the terminal to know an uplink/downlink configuration established by the base station before receiving SIB information, and accordingly the terminal and the base station should are restricted to transmit and receive the NPSS, the NSSS, the SIB1-NB, and the like through a downlink subframe that is applicable in common to all uplink/downlink configurations. In contrast, the present invention provides a method for performing signal transmission/reception by minimizing collision between signals within limited downlink resources, and thus the terminal and the base station may transmit/receive the signals using an optimized transmission/reception method.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. In other words, unintended effects according to implementation of the present invention may also be obtained by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 3 is a diagram illustrating an exemplary resource grid for the duration of a downlink slot.

DETAILED DESCRIPTION

Figure 1:
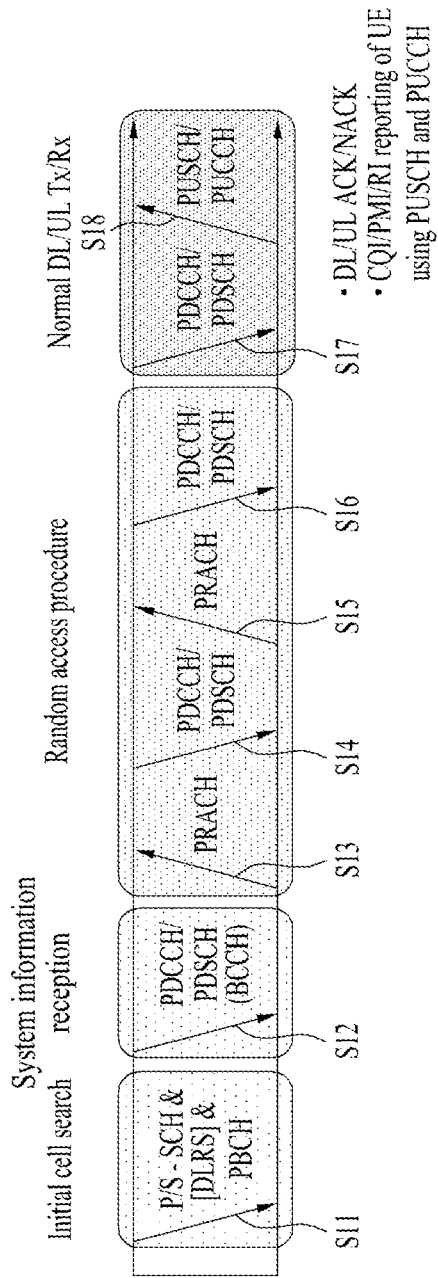
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to the base station. Specifically, the UE synchronizes its timing to the base station and acquires information such as a cell Identifier (ID) by receiving a Primary Synchronization Channel (P-SCH) and a Secondary Synchronization Channel (S-SCH) from the base station.

Then the UE may acquire information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may obtain more detailed system information by receiving a Physical Downlink Control Channel (PDCCH) and receiving a Physical Downlink Shared Channel (PDSCH) based on information of the PDCCH (S12).

To complete connection to the base station, the UE may perform a random access procedure with the base station (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2A:
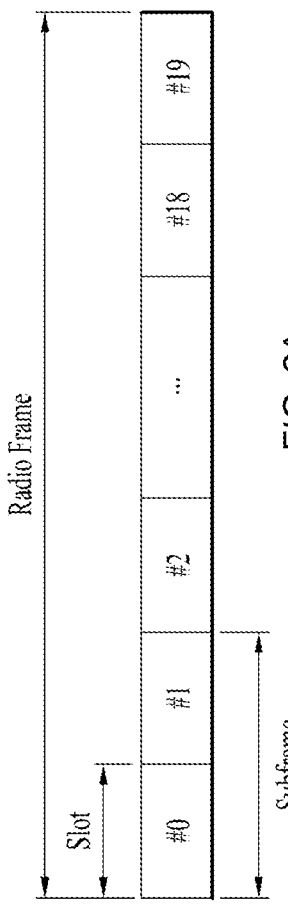
FIGS. 2A and 2B are diagrams illustrating exemplary radio frame structures.
Figure 2B:
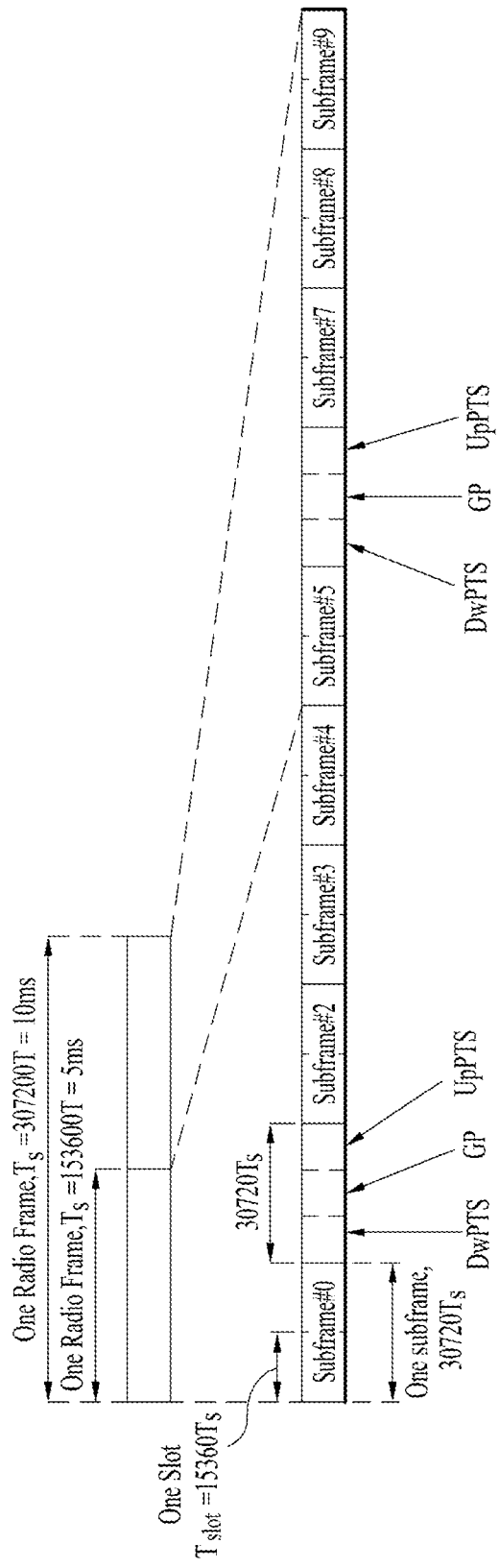

FIGS. 2A and 2B illustrate exemplary radio frame structures used in embodiments of the present disclosure.

FIG. 2A illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2B illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an base station. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |

TABLE 1-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
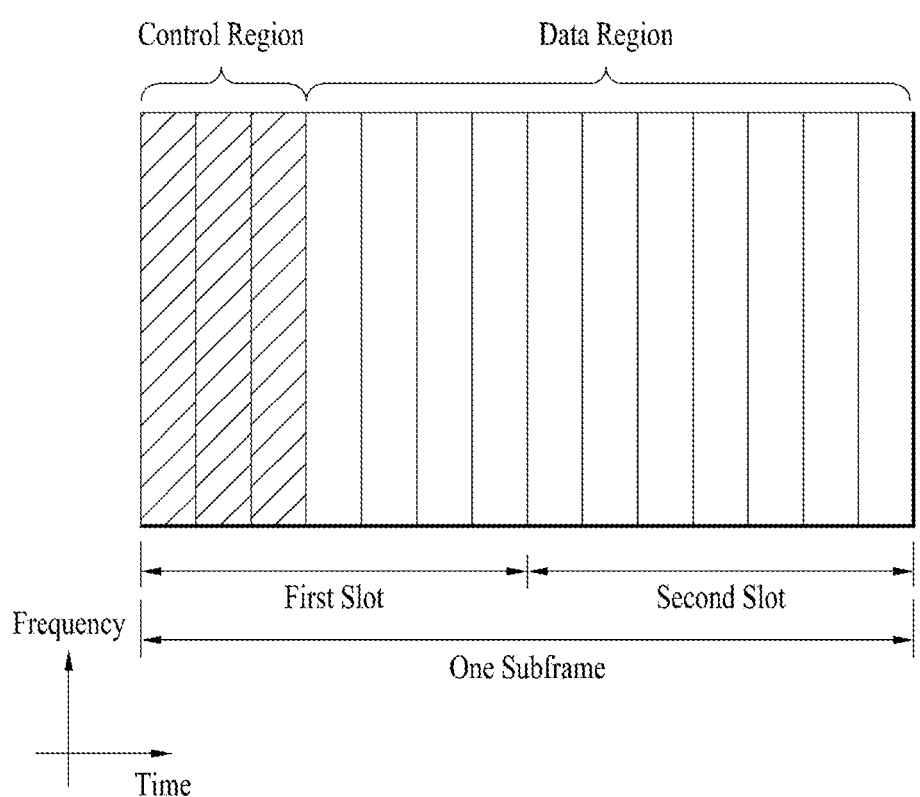
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

TABLE 2

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
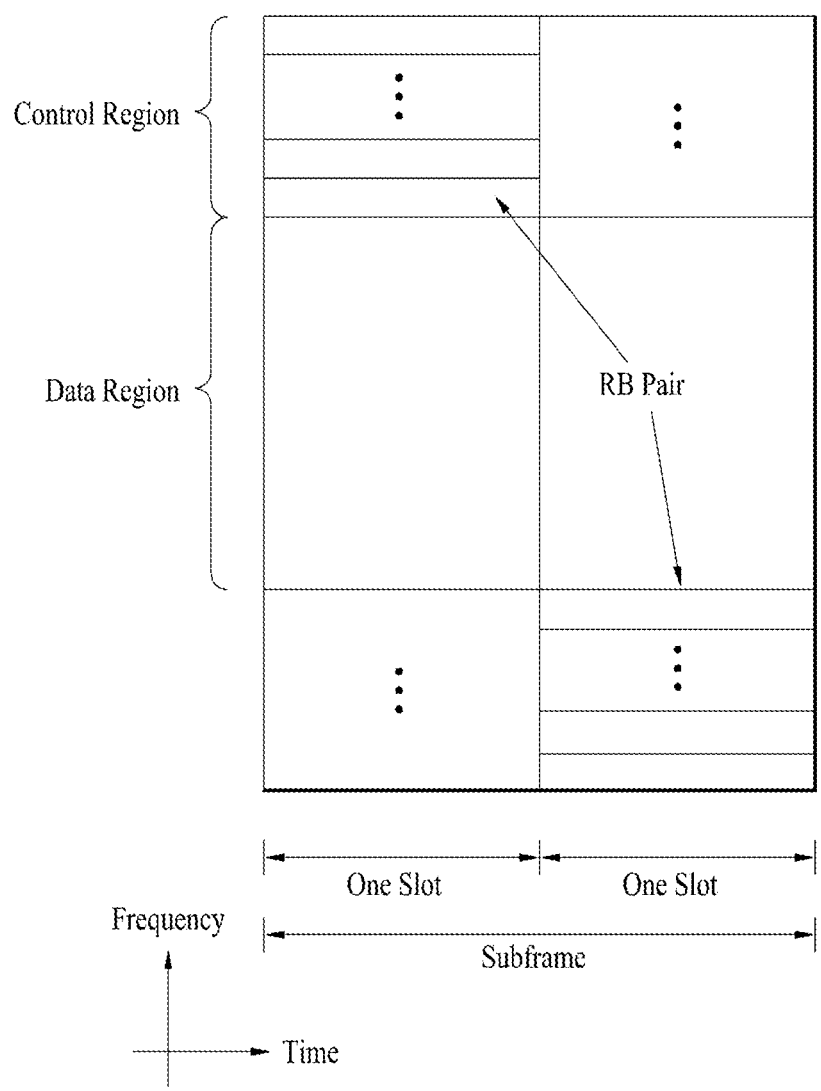
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain.

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of P and cyclic prefix information per carrier bandwidth part can be signaled in DL and UL, respectively. For example, the value of $\mu$ and cyclic prefix information per downlink carrier bandwidth part may be signaled though DL-BWP-mu and DL-MWP-cp corresponding to higher layer signaling. As another example, the value of $\mu$ and cyclic prefix information per uplink carrier bandwidth part may be signaled though UL-BWP-mu and UL-MWP-cp corresponding to higher layer signaling.

TABLE 3

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing p, slots may be numbered within one subframe in ascending order like $n_s^{\mu} \in \{0, \ldots N_{slot}^{subframe,\mu}-1\}$ and may also be numbered within a frame in ascending order like $n_{s,f}^{\mu} \in \{0, \ldots N_{slot}^{frame,\mu}-1\}$. In this case, the number of consecutive OFDM symbols in one slot ($N_{symb}^{slot}$) may be determined as shown in the following table according to the cyclic prefix. The start slot ($N_s^{\mu}$) of one subframe is aligned with the start OFDM symbol ($N_s^{\mu} N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
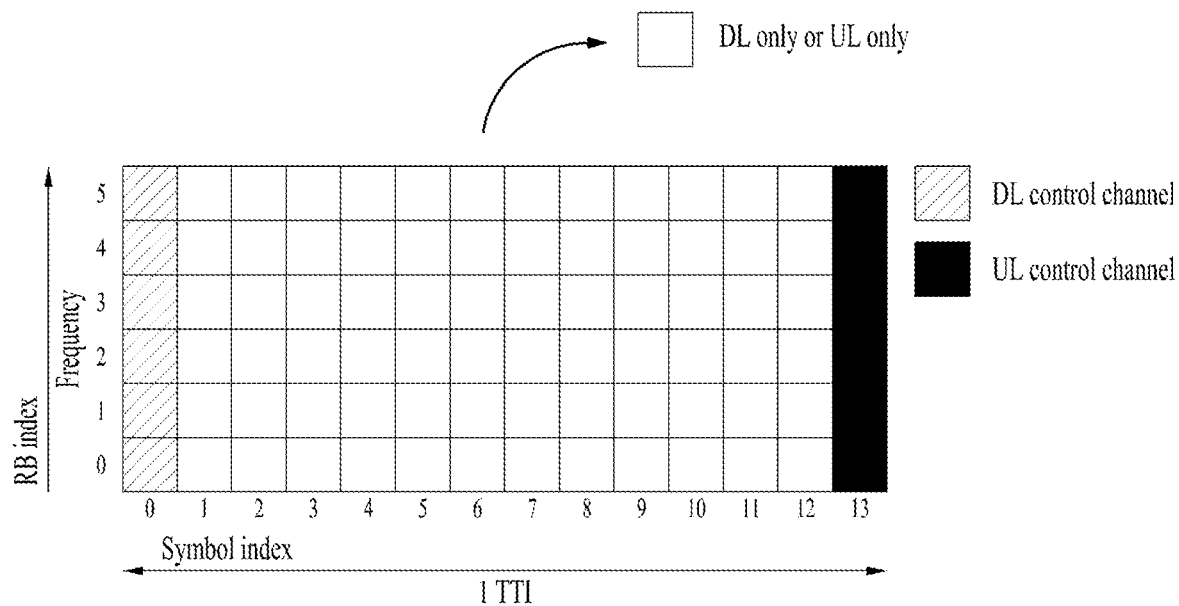
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the base station and UE can sequentially perform DL transmission and UL transmission in one slot. That is, the base station and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the base station and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
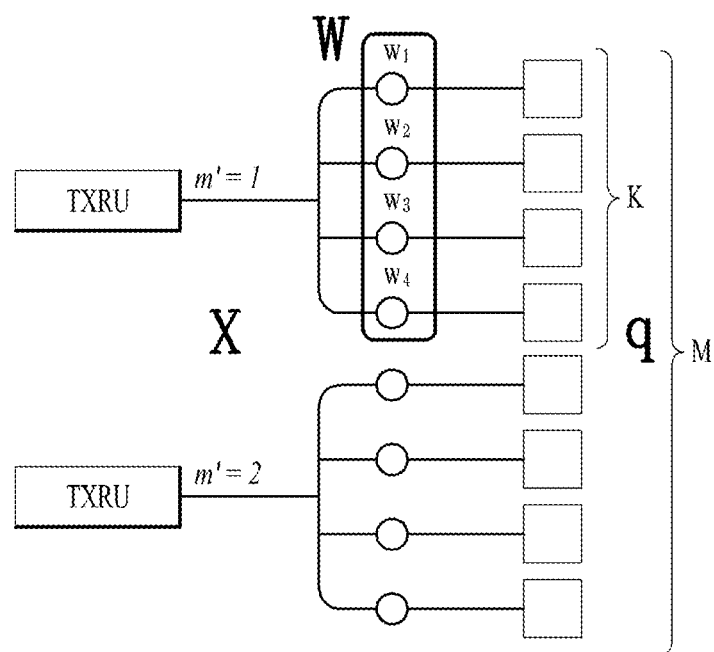
FIGS. 7 and 8 are diagrams illustrating representative methods for connecting TXRUs to antenna elements.
Figure 8:
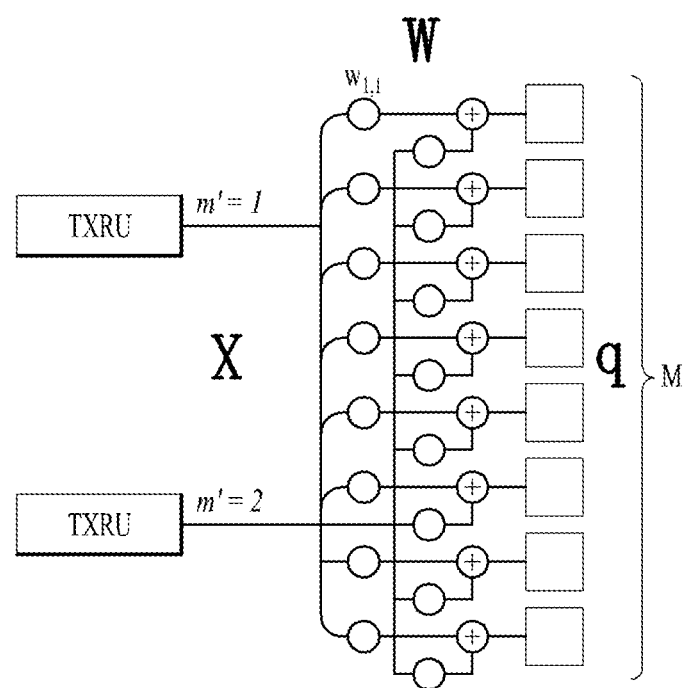

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 9:
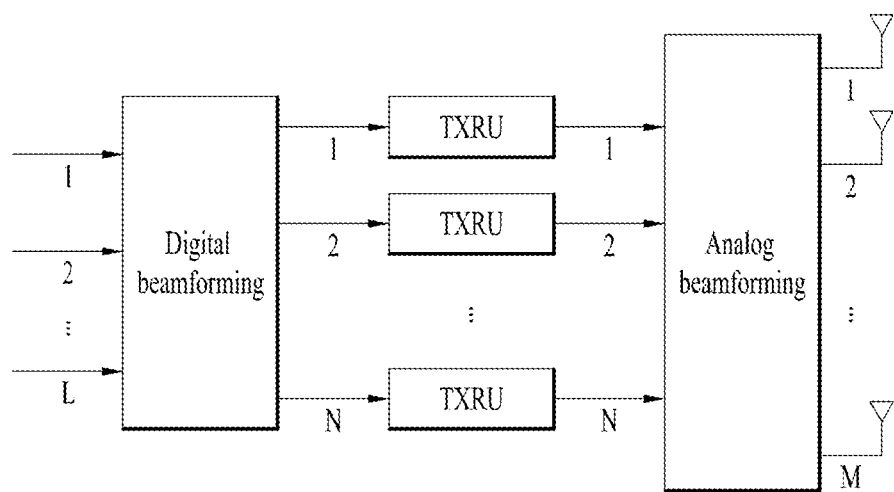
FIG. 9 is a diagram schematically illustrating an exemplary hybrid beamforming structure from the perspective of transceiver units (TXRUs) and physical antennas according to the present invention.

FIG. 9 is a diagram schematically illustrating an exemplary hybrid BF structure from the perspective of TXRUs and physical antennas according to the present invention. In FIG. 9, the number of digital beams is L and the number analog beams is N.

Additionally, in the NR system to which the present invention is applicable, an base station designs analog BF to be changed in units of symbols to provide more efficient BF support to a UE located in a specific area. Furthermore, as illustrated in FIG. 9, when N specific TXRUs and M RF antennas are defined as one antenna panel, the NR system according to the present invention considers introducing a plurality of antenna panels to which independent hybrid BF is applicable.

In the case in which the base station utilizes a plurality of analog beams as described above, the analog beams advantageous for signal reception may differ according to a UE. Therefore, in the NR system to which the present invention is applicable, a beam sweeping operation is being considered in which the base station transmits signals (at least synchronization signals, system information, paging, and the like) by applying different analog beams in a specific subframe (SF) on a symbol-by-symbol basis so that all UEs may have reception opportunities.

Figure 10:
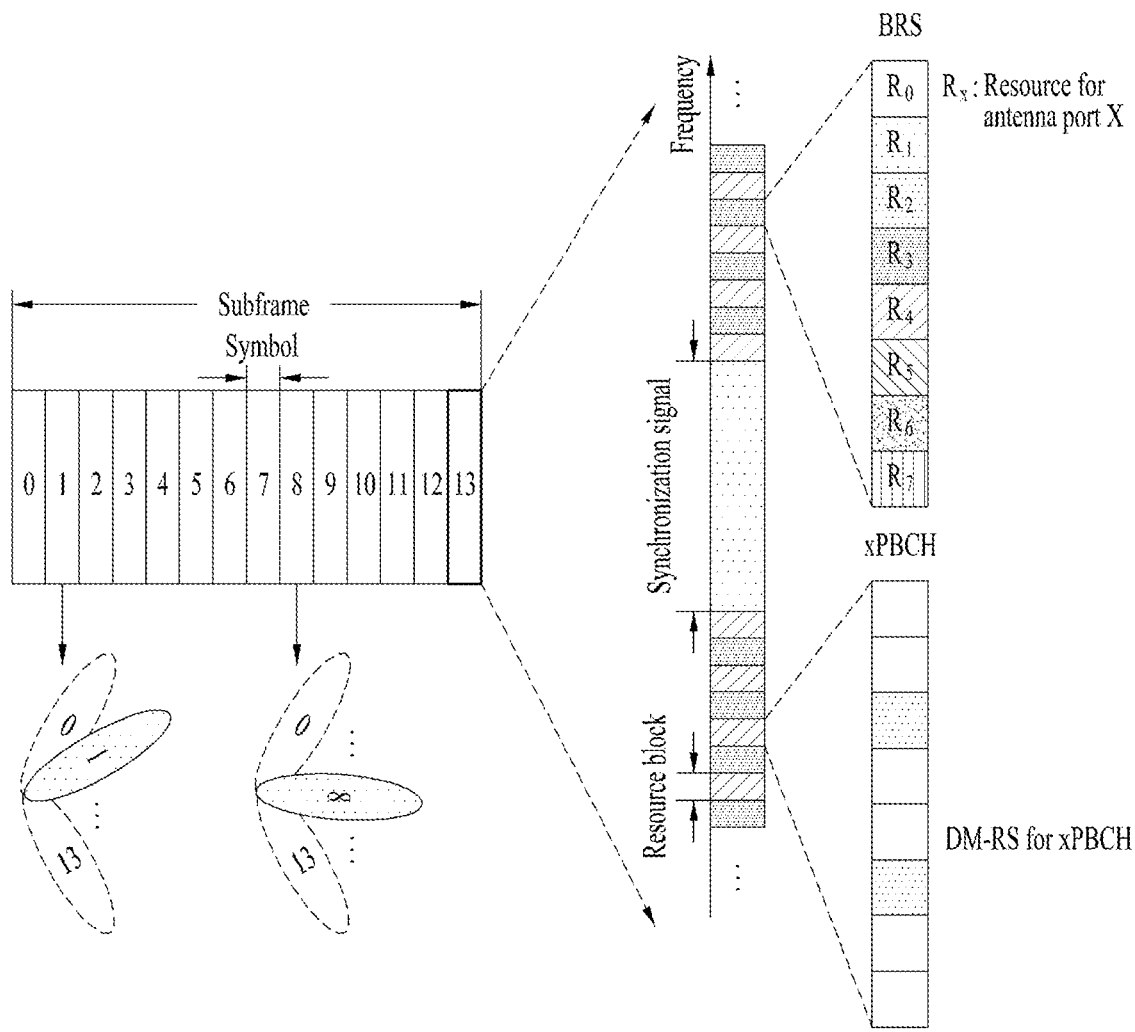
FIG. 10 is a diagram schematically illustrating an exemplary beam sweeping operation for a synchronization signal and system information in a downlink (DL) transmission procedure according to the present invention.

FIG. 10 is a diagram schematically illustrating an exemplary beam sweeping operation for a synchronization signal and system information in a DL transmission procedure according to the present invention.

In FIG. 10 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 10, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

3. Narrow Band-Internet of Things (NB-IoT)

Hereinafter, the technical features of NB-IoT will be described in detail. While the NB-IoT system based on the 3GPP LTE standard will be mainly described for simplicity, the same configurations is also applicable to the 3GPP NR standard. To this end, some technical configurations may be modified (e.g., subframe→slots)

Although the NB-IoT technology will be described in detail below based on the LTE standard technology, the LTE standard technology can be replaced with the NR standard technology within a range easily derived by those skilled in the art.

3.1. Operation Mode and Frequency

NB-IoT supports three operation modes of in-band, guard band, and stand-alone, and the same requirements apply to each mode.

(1) In the in-band mode, some of the resources in the Long-Term Evolution (LTE) band are allocated to NB-IoT.

(2) In the guard band mode, the guard frequency band of LTE is utilized, and the NB-IoT carrier is disposed as close to the edge subcarrier of the LTE as possible.

In the stand-alone mode, some carriers in the Global System for Mobile Communications (GSM) band are separately allocated and operated.

An NB-IoT UE searches for an anchor carrier in units of 100 kHz for initial synchronization, and the anchor carrier center frequency of the in-band and the guard band should be within ±7.5 kHz from a channel raster of 100 kHz channel. In addition, among the LTE PRBs, 6 middle PRBs are not allocated to NB-IoT. Therefore, the anchor carrier may only be positioned on a specific Physical Resource Block (PRB).

Figure 11:
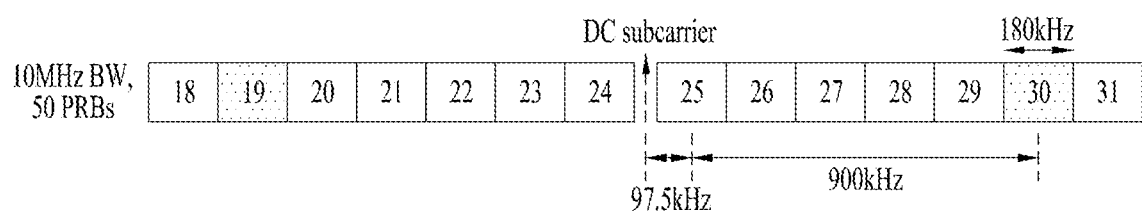
FIG. 11 is a diagram schematically illustrating arrangement of an in-band anchor carrier for an LTE bandwidth of 10 MHz.

FIG. 11 is a diagram schematically illustrating arrangement of an in-band anchor carrier for an LTE bandwidth of 10 MHz.

As shown in FIG. 11, a direct current (DC) subcarrier is positioned at a channel raster. Since the center frequency interval between adjacent PRBs is 180 kHz, PRB indexes 4, 9, 14, 19, 30, 35, 40 and 45 have center frequencies at ±2.5 kH from the channel raster.

Similarly, the center frequency of a PRB suitable for anchor carrier transmission is positioned at ±2.5 kHz from the channel raster in the case of a bandwidth of 20 MHz, and is positioned at ±7.5 kHz for bandwidths of 3 MHz, 5 MHz and 15 MHz.

In the guard band mode, the PRB immediately adjacent to the edge PRB of LTE is positioned at ±2.5 kHz from the channel raster in the case of the bandwidths of 10 MHz and 20 MHz. In the case of 3 MHz, 5 MHz, and 15 MHz, the center frequency of the anchor carrier may be positioned at ±7.5 kHz from the channel raster by using the guard frequency band corresponding to the three subcarriers from the edge PRB.

The stand-alone mode anchor carriers are aligned with a 100-kHz channel raster, and all GSM carriers, including DC carriers, may be used as NB-IoT anchor carriers.

In addition, the NB-IoT supports operation of multiple carriers, and combinations of in-band+in-band, in-band+guard band, guard band+guard band, and stand-alone+stand-alone may be used.

3.2. Physical Channel

3.2.1. Downlink (DL)

For the NB-IoT downlink, an Orthogonal Frequency Division Multiple Access (OFDMA) scheme with a 15 kHz subcarrier spacing is employed. This scheme provides orthogonality between subcarriers to facilitate coexistence with LTE systems.

On the downlink, physical channels such as a narrowband physical broadcast channel (NPBCH), a narrowband physical downlink shared channel (NPDSCH), and a narrowband physical downlink control channel (NPDCCH) are provided, and a narrowband secondary synchronization signal (NPSS), a narrowband primary synchronization signal (NSSS) and a narrowband reference signal (NRS) are provided as physical signals.

Figure 12:
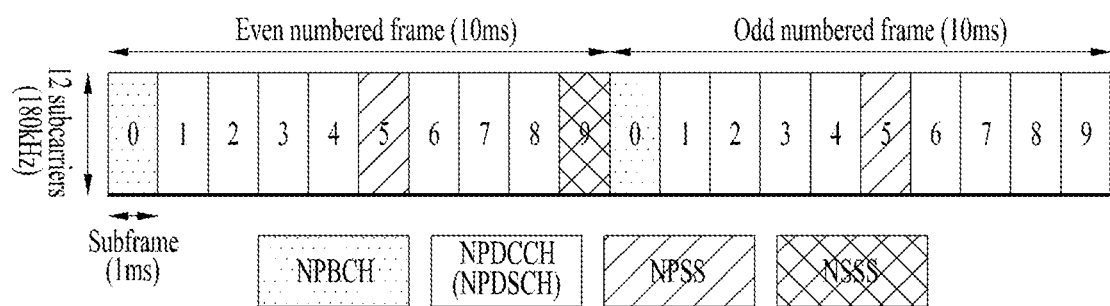
FIG. 12 is a diagram schematically illustrating positions where a physical downlink channel and a downlink signal are transmitted in an FDD LTE system.

FIG. 12 is a diagram schematically illustrating positions where a physical downlink channel and a downlink signal are transmitted in an FDD LTE system.

As shown in FIG. 12, the NPBCH is transmitted in the first subframe of each frame, the NPSS is transmitted in the sixth subframe of each frame, and the NSSS is transmitted in the last subframe of each even-numbered frame.

The NB-IoT UE should acquire system information about a cell in order to access a network. To this end, synchronization with the cell should be obtained through a cell search procedure, and synchronization signals (NPSS, NSSS) are transmitted on the downlink for this purpose.

The NB-IoT UE acquires frequency, symbol, and frame synchronization using the synchronization signals and searches for 504 Physical Cell IDs (PCIDs). The LTE synchronization signal is designed to be transmitted over 6 PRB resources and is not reusable for NB-IoT, which uses 1 PRB.

Thus, a new NB-IoT synchronization signal has been designed and is to the three operation modes of NB-IoT in the same manner.

More specifically, the NPSS, which is a synchronization signal in the NB-IoT system, is composed of a Zadoff-Chu (ZC) sequence having a sequence length of 11 and a root index value of 5.

Here, the NPSS may be generated according to the following equation.

$$d_l(n) = S(l) \cdot e^{-j\frac{\pi u n(n+1)}{11}}, n = 0, 1, \ldots, 10 \qquad \text{Equation 1}$$

Here, S(1) for symbol index 1 may be defined as shown in the following table.

TABLE 6

| Cyclic prefix length | S(3), . . . ,S(13) |   |   |   |    |    |   |   |   |    |   |
|---|---|---|---|---|---|---|---|---|---|---|---|
| Normal | 1 | 1 | 1 | 1 | −1 | −1 | 1 | 1 | 1 | −1 | 1 |

The NSSS, which is a synchronization signal in the NB-IoT system, is composed of a combination of a ZC sequence having a sequence length of 131 and a binary scrambling sequence such as a Hadamard sequence. In particular, the NSSS indicates a PCID to the NB-IoT UEs in the cell through the combination of the sequences.

Here, the NSSS may be generated according to the following equation.

$$d(n) = b_q(m)e^{-j2\pi\theta_f n}e^{-j\frac{\pi u n'(n'+1)}{131}} \qquad \text{Equation 2}$$

Here, the parameters in Equation 2 may be defined as follows.

TABLE 7

$n = 0,1, \ldots, 131$
$n' = n \bmod 131$
$m = n \bmod 128$
$u = N_{ID}^{Ncell} \bmod 126 + 3$
$q = \left\lfloor \frac{N_{ID}^{Ncell}}{126} \right\rfloor$ The binary sequence $b_q(m)$ may be defined as shown in the following table, and the cyclic shift $\theta_f$ for the frame number $n_f$ may be defined by the equation given below.

TABLE 8

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 1 −1 1 1 −1 1 −1 −1 1 1 −1 1 −1 1 1 −1 1 1 −1 1 −1 −1 1 1 −1 1 −1 1 1 −1 1 −1 −1 1 1 −1 1 1 −1 −1 1 1 −1 1 −1 −1 1 1 −1 1 1 −1 −1 1 1 −1 1 −1 −1 1 1 −1 1 1 −1 −1 1 1 −1 1 −1 −1 1 −1 1 1 −1 −1 1 −1 1 1 −1 1 −1 −1 1 −1 1 1 −1 1 −1 −1 1 −1 1 1 −1 −1 1 1 −1 1 −1 −1 1 1 −1] |
| 2 | [1 −1 −1 1 −1 1 1 1 −1 −1 1 1 1 −1 1 −1 −1 1 −1 −1 1 1 1 −1 −1 1 1 −1 1 1 1 −1 −1 1 1 1 −1 1 1 1 −1 −1 1 1 1 −1 −1 1 1 −1 −1 1 1 1 −1 1 1 1 −1 −1 −1 1 1 −1 1 1 1 −1 −1 1 −1 1 1 −1 1 −1 1 1 1 −1 −1 1 −1 1 1 −1 1 −1 1 1 −1 1 −1 −1 1 1 −1 1 −1 −1 −1 1 1 1 −1 1 −1 −1 1 −1 1 1 1 −1 1 −1 −1 1 −1 1 1 −1 1 −1 1 1] |
| 3 | [1 −1 −1 1 −1 1 1 −1 −1 1 1 −1 1 −1 −1 1 1 −1 1 −1 −1 1 1 −1 −1 1 −1 −1 1 1 −1 1 −1 1 1 −1 1 −1 −1 1 −1 1 1 −1 −1 1 1 −1 1 −1 −1 1 1 −1 1 1 −1 1 −1 −1 1 1 −1 1 1 −1 −1 1 −1 1 1 −1 1 −1 1 1 −1 −1 1 1 −1 1 −1 −1 1 −1 1 1 −1 1 −1 −1 1 −1 1 1 −1 −1 1 −1 1 1 −1 1 −1 1 1 −1 1 −1 1 1 −1 −1 1 1 −1 1 −1 −1 1 1 −1] |

$$\theta_f = \frac{33}{132}(n_f/2)\mod 4 \qquad \text{Equation 3}$$

The NRS is provided as a reference signal for channel estimation necessary for physical downlink channel demodulation and is generated in the same manner as in LTE. However, NBNarrowband-Physical Cell ID (PCID) is used as the initial value for initialization.

The NRS is transmitted to one or two antenna ports, and up to two base station transmit antennas of NB-IoT are supported.

The NPBCH carries the Master Information Block-Narrowband (MIB-NB), which is the minimum system information that the NB-IoT UE should know to access the system, to the UE.

The transport block size (TBS) of the MIB-NB, which is 34 bits, is updated and transmitted with a periodicity of transmission time interval (TTIs) of 640 ms, and includes information such as the operation mode, the system frame number (SFN), the hyper-SFN, the cell-specific reference signal (CRS) port number, and the channel raster offset.

The NPBCH signal may be repeatedly transmitted 8 times in total to improve coverage.

The NPDCCH has the same transmit antenna configuration as the NPBCH, and supports three types of downlink control information (DCI) formats. DCI N0 is used to transmit the scheduling information of the narrowband physical uplink shared channel (NPUSCH) to the UE, and DCIs N1 and N2 are used in transmitting information required for demodulation of the NPDSCH to the UE. Transmission of the NPDCCH may be repeated up to 2048 times to improve coverage.

The NPDSCH is a physical channel for transmission of a transport channel (TrCH) such as the downlink-shared channel (DL-SCH) or the paging channel (PCH). The maximum TBS is 680 bits and transmission may be repeated up to 2048 times to improve coverage.

3.2.2. Uplink (UL)

The uplink physical channels include a narrowband physical random access channel (NPRACH) and the NPUSCH, and support single-tone transmission and multi-tone transmission.

Multi-tone transmission is only supported for subcarrier spacing of 15 kHz, and single-tone transmission is supported for subcarrier spacings of 3.5 kHz and 15 kHz.

On the uplink, the 15-Hz subcarrier spacing may maintain the orthogonality with the LTE, thereby providing the optimum performance. However, the 3.75-kHz subcarrier spacing may degrade the orthogonality, resulting in performance degradation due to interference.

The NPRACH preamble consists of four symbol groups, wherein each of the symbol groups consists of a cyclic prefix (CP) and five symbols. The NPRACH only supports single-tone transmission with 3.75-kHz subcarrier spacing and provides CPs having lengths of 66.7 μs and 266.67 μs to support different cell radii. Each symbol group performs frequency hopping and the hopping pattern is as follows.

The subcarrier for transmitting the first symbol group is determined in a pseudo-random manner. The second symbol group hops by one subcarrier, the third symbol group hops by six subcarriers, and the fourth symbol group hops by one subcarrier hop.

In the case of repeated transmission, the frequency hopping procedure is repeatedly applied. In order to improve the coverage, the NPRACH preamble may be repeatedly transmitted up to 128 times.

The NPUSCH supports two formats. Format 1 is for UL-SCH transmission, and the maximum transmission block size (TBS) thereof is 1000 bits. Format 2 is used for transmission of uplink control information such as HARQ ACK signaling. Format 1 supports single-tone transmission and multi-tone transmission, and Format 2 supports only single-tone transmission. In single-tone transmission, p/2-binary phase shift keying (BPSK) and p/4-QPSK (quadrature phase shift keying) are used to reduce the peak-to-average power ratio (PAPR).

3.2.3. Resource Mapping

In the stand-alone and guard band modes, all resources included in 1 PRB may be allocated to the NB-IoT. However, in the in-band mode, resource mapping is limited in order to maintain orthogonality with the existing LTE signals.

The NB-IoT UE should detect NPSS and NSSS for initial synchronization in the absence of system information. Accordingly, resources (OFDM symbols 0 to 2 in each subframe) classified as the LTE control channel allocation region cannot be allocated to the NPSS and NSSS, and NPSS and NSSS symbols mapped to a resource element (RE) overlapping with the LTE CRS should be punctured.

Figure 13:
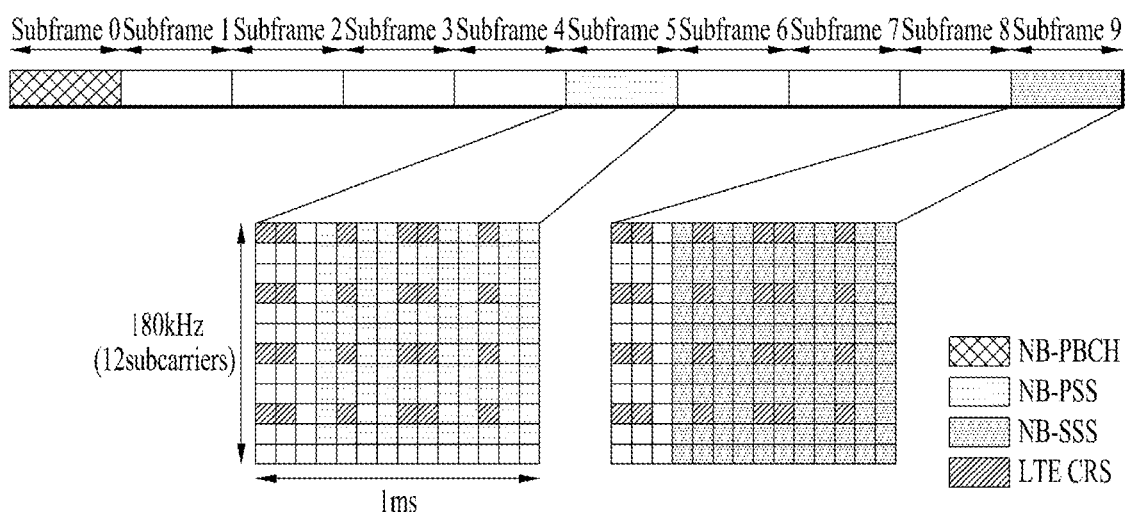
FIG. 13 is a diagram illustrating exemplary resource allocation of an NB-IoT signal and an LTE signal in an in-band mode.

FIG. 13 is a diagram illustrating exemplary resource allocation of an NB-IoT signal and an LTE signal in an in-band mode.

As shown in FIG. 13, for ease of implementation, the NPSS and NSSS are not transmitted on the first three OFDM symbols in the subframe corresponding to the transmission resource region for the control channel in the conventional LTE system regardless of the operation mode. REs for the common reference signal (CRS) in the conventional LTE system and the NPSS/NSSS colliding on a physical resource are punctured and mapped so as not to affect the conventional LTE system.

After the cell search, the NB-IoT UE demodulates the NPBCH in the absence of system information other than the PCID. Therefore, the NPBCH symbol cannot be mapped to the LTE control channel allocation region. Since four LTE antenna ports and two NB-IoT antenna ports should be assumed, the REs allocated to the CRS and NRS cannot be allocated to the NPBCH. Therefore, the NPBCH should be rate-matched according to the given available resources.

After demodulating the NPBCH, the NB-IoT UE may acquire information about the CRS antenna port number, but still may not know the information about the LTE control channel allocation region. Therefore, NPDSCH for transmitting System Information Block type 1 (SIB1) data is not mapped to resources classified as the LTE control channel allocation region.

However, unlike the case of the NPBCH, an RE not allocated to the LTE CRS may be allocated to the NPDSCH. Since the NB-IoT UE has acquired all the information related to resource mapping after receiving SIB1, the NPDSCH (except for the case where SIB1 is transmitted) and the NPDCCH may be mapped to available resources based on the LTE control channel information and the CRS antenna port number.

4. Proposed Embodiments

Hereinafter, the present invention will be described in more detail based on the technical ideas disclosed above.

The NB-IoT in the conventional LTE system is designed to be supportable only in the normal cyclic prefix (CP) of the frequency division duplex (FDD) system. For anchor-carriers on which the synchronization signals (e.g., the narrowband primary synchronization signal (NPSS), the narrowband secondary synchronization signal (NSSS), the master information block-narrow band (MIB-NB), and system information block type1-nb (SIB1-NB)) are transmitted, the transmission subframe position for each channel is fixed in the time domain as shown in the table given below.

TABLE 9

| | Subframe number | | | | | | | | | |
|---|---|---|---|---|---|---|---|---|---|---|
| | 0 | 1 | 2 | 3 | 4 | 5 | 6 | 7 | 8 | 9 |
| Even-numbered radio frame | NPBCH | | | | SIB1-NB | NPSS | | | | NSSS |
| Odd-numbered radio frame | NPBCH | | | | SIB1-NB | NPSS | | | | |

Here, the NPSS and NPBCH are transmitted in subframes 0 and 5 of each radio frame, respectively, while the NSSS is transmitted only in subframe 9 of an even-numbered radio frame. In addition, SIB1-NB (SystemInformationBlock-Type1-NB) may be transmitted over subframe 4 in every other frame within 16 consecutive radio frames, wherein the period and start position of the 16 radio frames may vary according to $N_{ID}^{Ncell}$ and schedulingInfoSIB1. However, even if subframes are not used for SIB-1NB transmission in a specific cell, SIB1-NB transmission may be performed in subframe 4 in another cell.

Therefore, it is required to transmit at least 4 DL subframes on the anchor-carrier for the NB-IoT service, and at least 5 DL subframes should be secured for the random access response and the CarrierConfigDedicated-NB transmission for the non-anchor carrier configuration.

On the other hand, in the TDD system, the number of DL subframes in a radio frame may be limited according to the UL/DL configuration, as shown in the table below.

TABLE 10

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D, U, and S denote downlink, uplink, and special subframe, respectively. For an eNB for which the Enhanced Interference Mitigation & Traffic Adaptation (eIMTA) feature is supported, a part of the UL subframes may be dynamically changed to DL subframes.

The DwPTS and the UpPTS are configured before and after a special subframe that is present between DL and UL intervals, respectively. The gap between the DwPTS and the UpPTS is used for downlink-to-uplink switching and timing advanced (TA). As described above, the configuration of the OFDM or SC-FDMA symbol level in the special subframe may be represented as shown in FIGS. 14 to 17 according to the CP length of the downlink and uplink and the higher layer parameter srs-UpPtsAdd. Here, as described above, X (srs-UpPtsAdd) may not be set to 2 for special subframe configurations {3, 4, 7, 8} for normal CP in downlink and special subframe configurations {2, 3, 5, 6} for extended CP in downlink. In addition, X (srs-UpPtsAdd) may not be set to 4 for special subframe configurations {1, 2, 3, 4, 6, 7, 8} for normal CP in downlink and special subframe configurations {1, 2, 3, 5, 6} for extended CP in downlink.

Figure 14:
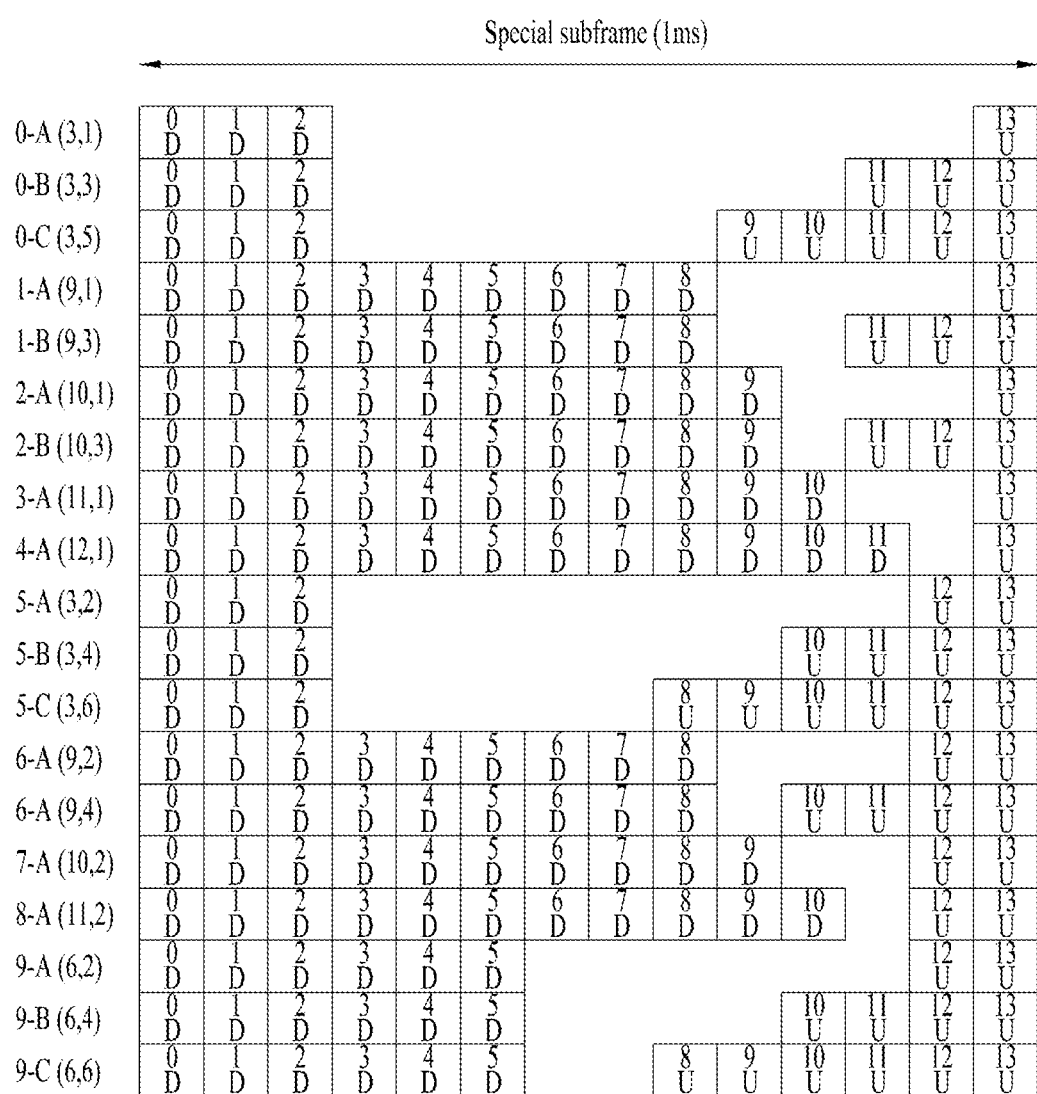
FIGS. 14 to 17 are diagrams illustrating various examples of special sub-frame configuration.

FIG. 14 is a diagram illustrating special subframe configurations to which normal CP in DL and normal CP in UL are applied.

Figure 15:
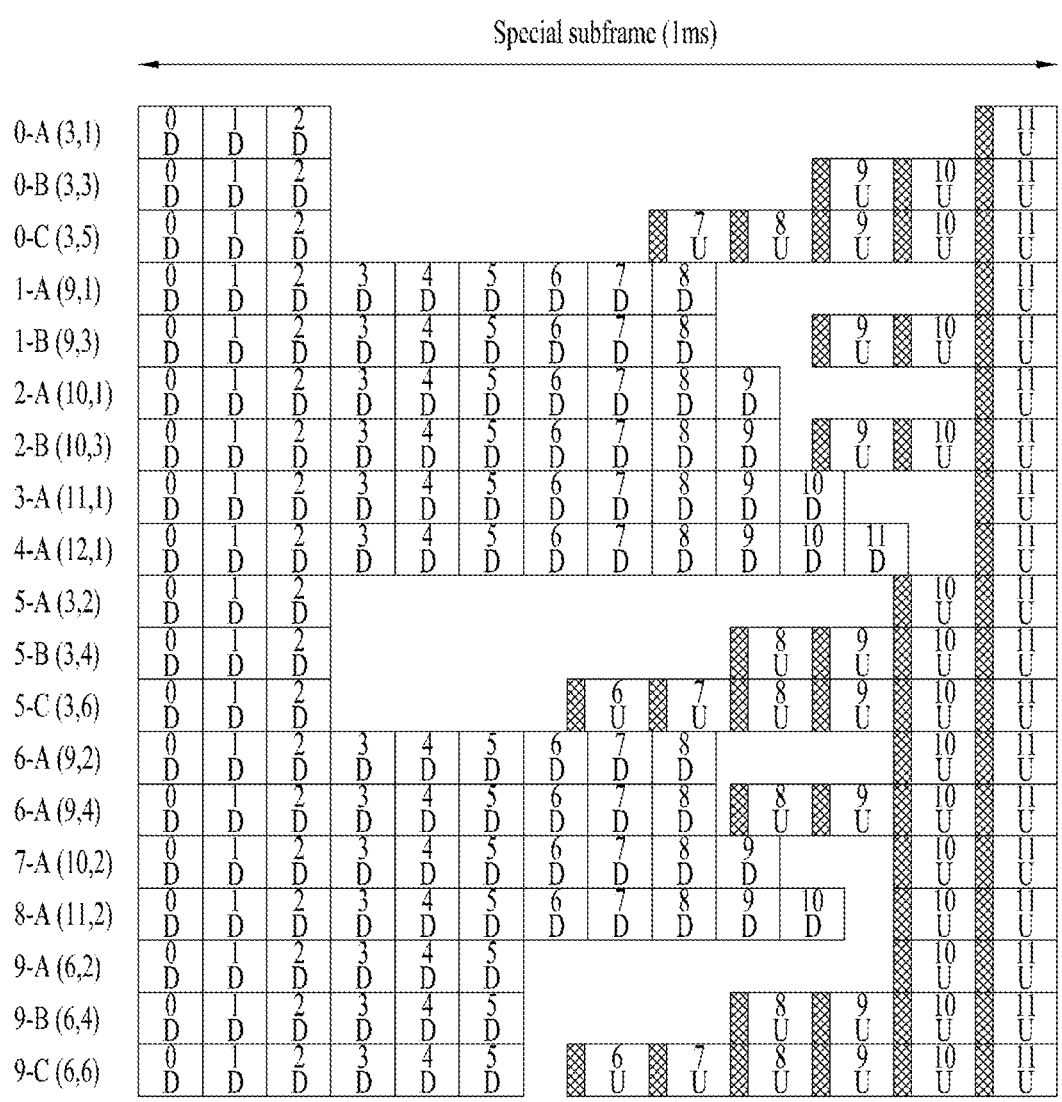

FIG. 15 is a diagram illustrating special subframe configurations to which normal CP in DL and extended CP in UL are applied.

Figure 16:
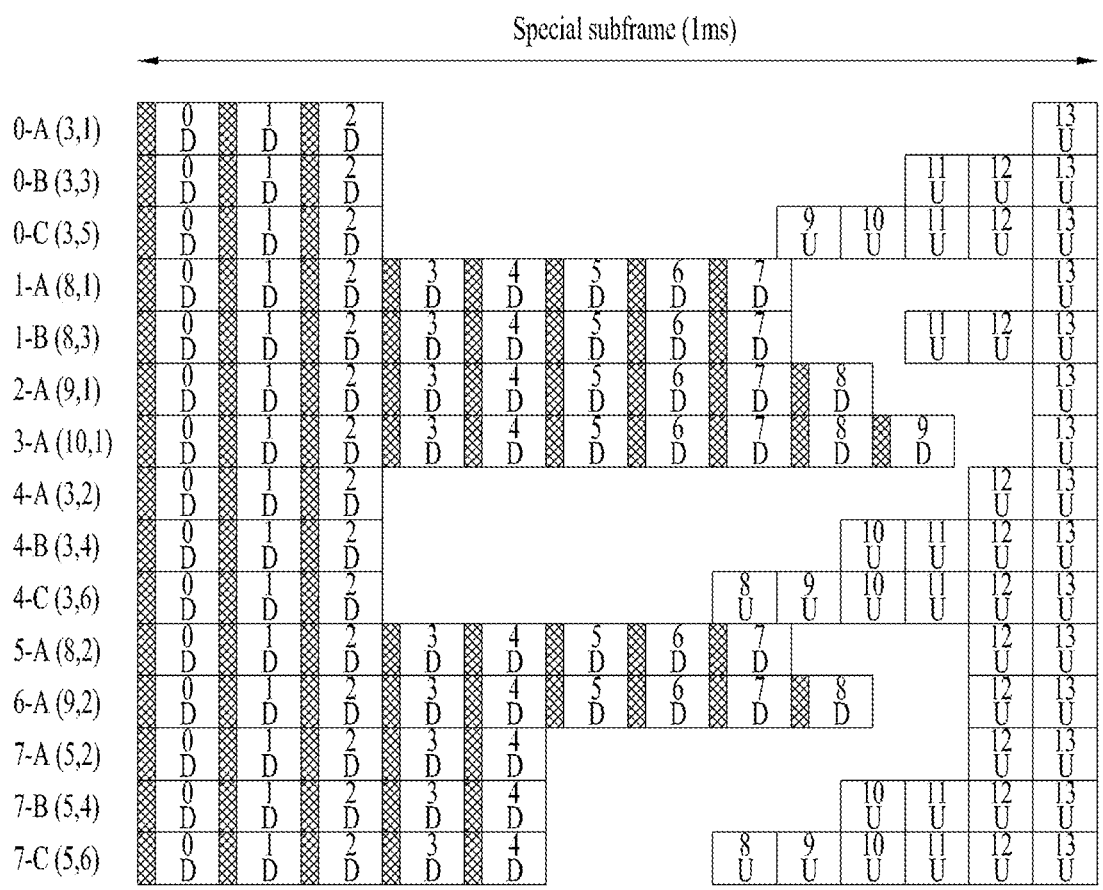

FIG. 16 is a diagram illustrating special subframe configurations to which extended CP in DL and normal CP in UL are applied.

Figure 17:
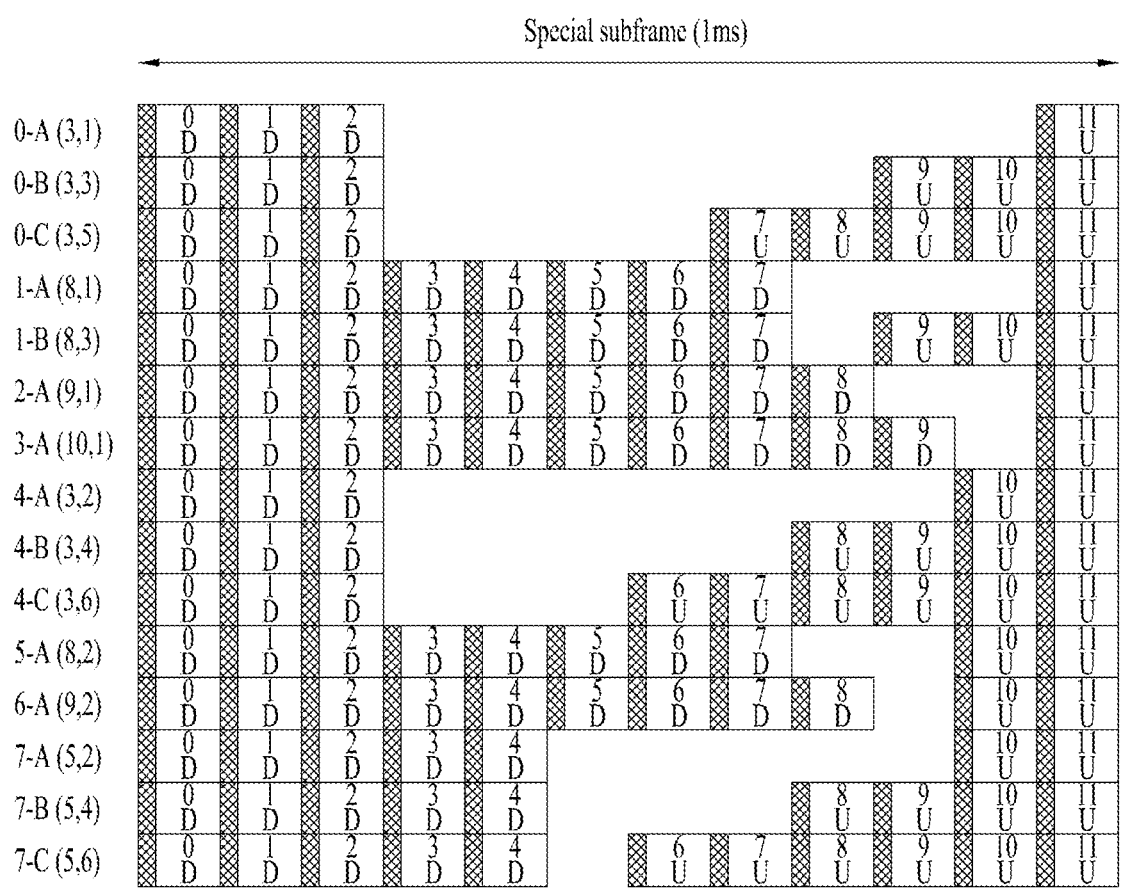

FIG. 17 is a diagram illustrating special subframe configurations to which extended CP in DL and extended CP in UL are applied.

Figure 18:
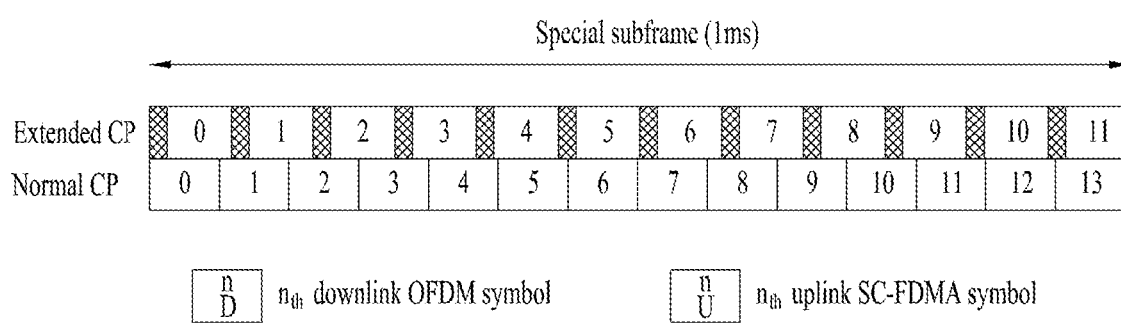
FIG. 18 is a diagram illustrating subframe configuration and the meaning of notations according to the CP length in FIGS. 14 to 17.

FIG. 18 is a diagram illustrating subframe configuration and the meaning of notations according to the CP length in FIGS. 14 to 17. As shown in FIG. 18, a subframe according to extended CP is composed of 12 symbols, and a subframe according to normal CP is composed of 14 symbols. Here, each DL symbol and UL symbol may be represented as shown at the bottom in FIG. 18. Hereinafter, it is assumed that the same structure as described above is applied to the present invention.

Here, it is assumed that the n-th downlink/uplink symbol of DwPTS/UpPTS and the index n of an additional downlink/uplink symbol conform to the index numbers of FIG. 18 for convenience of explanation and expression. That is, in each configuration, the starting index of n_U may not be 0.

In FIGS. 14 to 17, the null period of the DwPTS and UpPTS periods may be used as a DL-to-UL switching gap by the UE (e.g., the NB-IoT UE), and may be configured as about 20 usec, which is about 1/3 times shorter than the periodicity of the OFDM or SC-FDMA symbol.

Also, n-A (x, y) in each row represents the default type of the n-th special subframe configuration having DwPTS and UpPTS periods including x and y OFDM and SC-FDMA symbols, and n-B (x,y+2) and n-C(x,y+4) represent special subframe configurations in which the number of SC-FDMA symbols is increased from the default type n-A (x, y) according to the value of X (srs-UpPtsAdd).

As described above, in the TDD system, the number of subframes fixed to downlink may vary according to the UL/DL configuration, and even the number of OFDM symbols fixed to downlink in the special subframe may vary according to the special subframe configuration.

However, when the eIMTA feature is supported, the eNB may be allowed to dynamically change a part of the uplink subframes to downlink subframes.

However, considering the fixed scheduling of NPSS, NSSS, NPBCH, and SIB1-NB of the NB-IoT system, the eIMTA scheme in which a specific uplink subframe is always changed to a downlink subframe may not be desirable.

Therefore, in order to support NB-IoT in the TDD system, it is necessary to design a structure capable of supporting available downlink subframes or OFDM symbols as many as possible according to a combination of various UL/DL configurations and special subframe configurations.

To design an NB-IoT anchor-carrier structure suitable for the TDD system, the following items or constraints may be considered.

1. Operation Mode

NB-IoT supports four operation modes (In-band SamePCI, In-band DifferentPCI, guard band, standalone). The operation mode of an anchor-carrier is transmitted in the MIB-NB of the NPBCH. Accordingly, an NB-NB-IoT channel structure in which the NB-IoT UE can perform the same synchronization regardless of the operation mode until detection and decoding of the NPSS, NSSS and NPBCH of the NB-IoT UE needs to be provided. Otherwise, the NB-IoT UE needs to add blind detection and decoding according to the operation mode. This structure is not suitable for the NB-IoT modem, which has a feature of "low cost and long battery life."

2. UL/DL Configuration and Special Subframe Configuration

As can be seen from Table 10, subframe 0 and subframe 5 are downlink subframes available to all UL/DL configurations in common. Subframe 1 may always be configured as a partial downlink subframe, and subframe 6 may be configured as a partial downlink subframe or a fulldownlink subframe (a subframe in which all symbols are configured for downlink OFDM) according to the UL/DL configuration.

Therefore, in order to support NB-IoT in all UL/DL configurations, only subframes 0 and 5 may be used as full downlink subframes.

On the other hand, when another NB-IoT channel structure is designed according to the UL/DL configuration and the special subframe configuration to secure another downlink subframe or OFDM symbol as a full downlink subframe, blind detection and decoding may be added. This structure is not suitable for the NB-IoT modem featuring "low cost and long battery life."

3. Reuse of NPSS and NSSS of LTE Rel.14

As described above, NPSS and NSSS are defined in the 3GPP standard.

More specifically, the NPSS includes a Zadoff-Chu sequence and a cover sequence of Table 4, and is allocated to 11 OFDM symbols except for the first 3 OFDM symbols of the subframe for transmission.

The NSSS is additionally subjected to phase rotation according to the binary sequence and frame number of Table 8 based on the Zadoff-Chu sequence, and then allocated to 11 OFDM symbols except for the first three OFDM symbols of the subframe as in the case of the NPSS so as to be transmitted.

In other words, in order to allocate the NPSS and NSSS, one PRB pair having 12 resource elements (REs) is required in the frequency domain, and 12 OFDM symbols are required in the time domain. In addition, the NPSS and NSSS may be positioned on the consecutive OFDM symbols so as to assume that there is a little change in channel in each sequence in the time domain. If some symbols in each sequence are arranged non-consecutively in the time domain, decoding performance may be degraded.

Therefore, even in NB-IoT of the TDD system, the NPSS and NSSS need to be allocated to at least 11 consecutive OFDM symbols in the time domain.

4. Re-Use of NPBCH of LTE Rel. 14

The NPBCH is transmitted on 11 consecutive OFDM symbols in every subframe 0. However, unlike the NPSS and NSSS, MIB-NB, which has a payload of 34 bits (with space of 11 bits) and cyclic redundancy check (CRC) of 16 bits is subjected to 1/3 tail-biting convolutional code (TBCC) encoding and rate matching and is then subjected to QPSK modulation so as to be transmitted for 640 msec.

Then, the NPBCH may be demodulated and decoded through narrow band reference signal (NRS)-based channel estimation.

Therefore, unlike the NPSS and NSSS, the NPBCH does not need to have 11 consecutive OFDM symbols in the time domain. Even when it is transmitted on non-consecutive OFDM symbols, and may be designed by changing the existing structure only if the NRS four channel estimation is included in the non-consecutive OFDM symbol interval.

However, in order to support the same modulation ordering (QPSK) and code rate as those of the existing NPBCH, it needs to be allocated to 11 OFDM symbols in the radio frame, or 100 REs are required except for CRS REs of 4 ports and NRS REs of 2 ports.

In this case, if different PBCH structures are designed according to the operation mode and the UL/DL configuration, they may not be suitable for the NB-IoT modem which has a feature of "low cost and long battery life" from the perspective of the NB-IoT UE because blind detection and decoding are added.

In the present invention, based on the considerations and constraints described above, a detailed description will be given of the structures and arrangement of synchronization signals (NPSS and NSSS), channels (NPBCH), NRS-B (which is a reference signal for PBCH demodulation and may be different from NPDCCH and/or NRS of NPDSCH), and SIB1-NB for the TDD system, and a signal transmission/reception method based thereon.

4.1. First Proposal: "Designate the Default Carrier for NPBCH and SIB1-NB

In this section, as a way to support NB-IoT operation in all UL/DL configurations, an arrangement structure in which the NPSS and NSSS or the NSSS and NPSS are transmitted and received in subframe 0 and subframe 5 based on UL/DL configuration 0, which has the smallest number of downlink subframes. Here, the subject transmitting the NPSS and/or the NSSS may be an eNB, and the subject receiving the NPSS and/or the NSSS may be an NB-IoT UE.

Here, because the full downlink subframes in which the NPBCH and the SIB1-NB can be transmitted may be insufficient, the NPBCH and the SIB1-NB may be transmitted on a non-anchor carrier in the present invention.

However, as the non-anchor carrier operation is defined as the capability of a UE, there may be a case where non-anchor configuration is not possible depending on the capability of the UE. When configuration is established so as not to support UL/DL configuration 0 particularly for a NB-IoT UE for which only the single-carrier operation is supported, ambiguity may occur for the NB-IoT UE because the UL/DL configuration is not recognizable using sequence information about the NPSS and NSSS alone. Thereby, it is difficult for the eNB to expect the correct operation of the NB-IoT UE.

Therefore, in order to support the NB-IoT operation in all TDD UL/DL configurations, it is necessary to assume that the non-anchor carrier operation of the UE is mandatory. In this case, the TDD NB-IoT UE may detect the NPSS and NSS on the anchor-carrier, change the frequency to a specific default carrier, and expect NPBCH and SIB1-NB to be received on the non-anchor carrier.

Here, the default non-anchor carrier on which NPBCH and SIB1-NB can be transmitted (and random access can be performed), may be referred to as a second-anchor carrier. This operation may be pre-defined by an equation representing a relationship between the anchor-carrier and the second-anchor carrier using a similar method to E-UTRA Absolute Radio Frequency Channel Number (EARFCN) or may be pre-defined as a specific offset value. Here, the method similar to EARFCN may be defined as the following equation.

$$F_{UL} = F_{DL\_low} + 0.1(N_{DL} - N_{Offs,DL}) + 0.0025(2M_{DL} + 1) + f(M_{DL})[\text{MHz}] \quad \text{Equation 4}$$

Here, $F_{UL}$ and $F_{DL\_low}$ denote the second-anchor carrier frequency and the lowest frequency (constant) of the corresponding band, respectively, and $N_{DL}$, $N_{Offs,DL}$, and $M_{DL}$ denote the downlink EARFCN number, an offset value for calculation of the downlink EARFCN, and the downlink channel number of NB-IoT. In addition, $f(M_{DL})$ denotes a function indicating the relative offset between the anchor-carrier and the second-anchor carrier and may have a value greater than or equal to 0. $f(M_{DL})$ be set to be band-agnostic or band non-agnostic, and the values thereof may be limited in consideration of 3 MHz, which is the minimum LTE bandwidth in which the NB-IoT operation can be performed. In other words, only PRB 2 or 12 is allowed to be used as the anchor carrier at 3 MHz, and the assignable second-anchor carrier may be set to one of 8 values except for either center 6 RBs or the anchor-carrier.

The NPSS, NSSS, and NPBCH may be configured to be transmitted on the anchor-carrier, and only SIB1-NB may be configured to be transmitted on the second-anchor carrier. This configuration may be applied even to a case where NB-IoT is not supported in UL-DL configuration 0. In this case, the parameters of $f(M_{DL})$ may be allocated to the information of the 11 spare bits in addition to schedulingInfoSIB1-r13 of the MIB-NB and provided to the NB-IoT UE.

4.2. Second Proposal: "Use the Same Subframe Positions as in the Previous Cases for NPSS, NSSS, and NPBCH, and Vary the Position of SIB1-NB According to UL/DL Configurations (Part A)"

In this section, a detail description will be given of a method of varying the subframe position of SIB1-NB according to the UL/DL configuration while maintaining the same structure of NPSS, NSSS and NPBCH as the previous cases, assuming that NB-IoT is not supported in UL/DL configuration 0.

However, since the subframe position of SIB1-NB is not fixed, information about scheduling of SIB1-NB may be added to and transmitted in MIB-NB.

According to the method proposed in this section, the subframe positions of the NPSS, NSSS, NPBCH, and SIB1-NB may be configured as shown in the following two tables. Alternatively, SIB1-NB and NSSS may be transmitted in subframe 9 alternately every 10 msec.

TABLE 11

| | | Subframe number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | D NPBCH | S | U | U | U | D NPSS | S | U | U | U |
| | 1 | D NPBCH | S | U | U | D SIB1-NB | D NPSS | S | U | U | D NSSS |

TABLE 11-continued

| | | | | | Subframe number | | | | | |
|---|---|---|---|---|---|---|---|---|---|---|
| | | 0 | 1 | 2 | 3 | 4 | 5 | 6 | 7 | 8 | 9 |
| | 2 | D<br>NPBCH | S | U | D | D<br>SIB1-NB | D<br>NPSS | S | U | D | D<br>NSSS |
| | 3 | D<br>NPBCH | S | U | U | U | D<br>NPSS | D | D | D<br>SIB1-NB | D<br>NSSS |
| | 4 | D<br>NPBCH | S | U | U | D<br>SIB1-NB | D<br>NPSS | D | D | D | D<br>NSSS |
| | 5 | D<br>NPBCH | S | U | D | D<br>SIB1-NB | D<br>NPSS | D | D | D | D<br>NSSS |
| | 6 | D<br>NPBCH | S<br>SIB1-NB-A | U | U | U | D<br>NPSS | S<br>SIB1-NB-B | U | U | D<br>NSSS |

TABLE 12

| | | | | | Subframe number | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | D<br>NPBCH | S | U | U | U | D<br>NPSS | S | U | U | U |
| | 1 | D<br>NPBCH | S | U | U | D<br>SIB1-NB | D<br>NPSS | S | U | U | D<br>NSSS |
| | 2 | D<br>NPBCH | S | U | D<br>SIB1-NB | D | D<br>NPSS | S | U | D | D<br>NSSS |
| | 3 | D<br>NPBCH | S | U | U | U | D<br>NPSS | D<br>SIB1-NB | D | D | D<br>NSSS |
| | 4 | D<br>NPBCH | S | U | U | D | D<br>NPSS | D | D<br>SIB1-NB | D | D<br>NSSS |
| | 5 | D<br>NPBCH | S | U | D | D | D<br>NPSS | D | D | D<br>SIB1-NB | D<br>NSSS |
| | 6 | D<br>NPBCH | S<br>SIB1-NB-A | U | U | U | D<br>NPSS | S<br>SIB1-NB-B | U | U | D<br>NSSS |

Here, the NSSS is transmitted only in subframe 9 of an even-numbered radio frame. In this case, since UL/DL configuration 0 has only two fulldownlink subframes in the radio frame, it is assumed that UL/DL configuration 0 is not considered in the second proposal.

In addition, UL/DL configuration 6 has only three full-downlink subframes in the radio frame. Accordingly, in UL/DL configuration 6, SIB1-NB may be divided into SIB1-NB-A and SIB1-NB-B and transmitted using the DwPTS of special subframes 1 and 6, or may be transmitted through only one of special subframes 1 and 6. This method may be considered particularly in the NB-IoT system according to the 3GPP NR system.

As a method to vary the scheduling of SIB1-NB according to the UL/DL configuration and special subframe configurations, SIB1-NB scheduling information needs to be changed in or added to MIB-NB and transmitted.

Information for SIB1-NB scheduling may be included in the MIB as 4-bit information and transmitted to the NB-IoT UE. The 4-bit information of the MIB may determine the repetition number and TB S of the SIB1-NB and be transmitted by being modulated through quadrature phase shift keying (QPSK).

Then, the NB-IoT UE uses 11 OFDM symbols except for the first 3 OFDM symbols in the radio frame, and performs rate matching based on the NB-IoT antenna port information and LTE antenna port information obtained from NPBCH detection. In particular, the NB-IoT UE may determine the position of the radio frame in which the SIB1-NB is transmitted, based on the SIB1-NB repetition information obtained from the MIB-NB and $N_{ID}^{Ncell}$ obtained from the NSSS.

The NB-IoT UE may use "a part of the 11 spare bits for the NPBCH" or "a CRC mask different from the conventional NPBCH CRC masking" to acquire the information about the subframe position of the SIB1-NB.

Here, according to the method of "using a part of the 11 spare bits for the NPBCH", up to 2048 pieces of information can be distinguished from each other. However, since there is a possibility that the spare bits will be used for indication of other information in the future, a minimum number of bits may be allocated to information about the subframe position of the SIB1-NB.

According to the method of "using a CRC mask different from the conventional NPBCH CRC masking," performance of the CRC false alarm may be affected by the amount of added information. Accordingly, the information about the SIB1-NB needs to be distinguished at the minimum level. In this case, the information about the SIB1-NB may be distinguished in each case as follows.

1. When the Position of SIB1-NB is Fixed According to UL/DL Configurations

Referring to Table 11, SIB1-NB may be transmitted in (over) subframe 4 or 9 or subframe 1 or 6 (or 1 and 6). Accordingly, the information about the subframe position of SIB1-NB may be divided into a maximum of four (or five) pieces.

2. When the Position of SIB1-NB Changes According to UL/DL Configurations

Referring to Table 12, SIB1-NB may be transmitted in (over) subframe 3, 4, 6, 7, 8, or 1 (or subframes 1 and 6). In this case, the information about the subframe position of SIB1-NB may be divided into a maximum of six (or seven) pieces.

3. When the Position of SIB1-NB Changes According to Special Subframe Configurations Referring to Tables 11 and 12, in the case of UL/DL configuration 6, NPSS, NSSS, and NPBCH are allocated to the fulldownlink subframes, and accordingly SIB1-NB may be allocated to subframe 1 or 6 (or subframes 1 and 6), which are special subframes.

In this case, the DwPTS period varies among the special subframe configurations. Thereby, the number of available OFDMs may be limited. Further, because the number of OFDM symbols in the control region is not known until the NB-IoT UE decodes SIB1-NB, the number of OFDM symbols on which SIB1-NB can be transmitted except for 3 OFDM symbols in the DwPTS period may be further reduced.

Accordingly, to use as many OFDM symbols as possible in the DwPTS period, the eNB may transmit, to the NB-IoT UE, information about "the number of symbols of the control region of the SIB1-NB subframes on the NPBCH."

In addition, there are 10 special subframe configurations for normal CP and types and 8 special subframe configurations for extended CP. However, in distinguishing only information about the DwPTS period, 6 special subframe configurations are enough for normal CP and 5 special subframe configurations are enough for extended CP.

Further, if the number of downlink OFDM symbols of the DwPTS is insufficient, a downlink OFDM symbol may be further allocated in the gap period subsequent to the DwPTS to transmit the SIB1-NB. In this case, a legacy LTE reference signal (e.g., CRS) may not be included in the downlink OFDM symbol added after the DwPTS period. As a result, rate matching for SIB1-NB may be applied differently from the existing DwPTS or fulldownlink subframes.

Alternatively, SIB1-NB and NSSS may be transmitted in subframe 9 alternately every 10 msec.

4.3. Third Proposal: "Use the Same Subframe Positions as in the Previous Cases for NPSS, NSSS, and NPBCH, and Vary the Position of SIB1-NB According to UL/DL Configurations (Part B)"

In this section, a method which is similar to the second proposal and allows even UL/DL configuration 0 to be used will be described in detail.

The proposed method, however, may be applied only to the eNB supporting the eIMTA or the eNB allowing the scheduling constraint on subframe 9. According, uplink subframe 9 may be changed to a downlink subframe every 2 msec as shown in the table below.

In addition, the SIB1-NB may be divided into two parts as in UL/DL subframe configuration 6 and transmitted in subframes 1 and 6.

Alternatively, the SIB1-NB and NSSS may be transmitted in subframe 9 alternately every 10 msec.

TABLE 13

| | | Subframe number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | D NPBCH | S SIB1-NB-A | U | U | U | D NPSS | S SIB1-NB-B | U | U | U or D NSSS |
| | 1 | D NPBCH | S | U | U | D SIB1-NB | D NPSS | S | U | U | D NSSS |
| | 2 | D NPBCH | S | U | D | D SIB1-NB | D NPSS | S | U | D | D NSSS |
| | 3 | D NPBCH | S | U | U | U | D NPSS | D | D | D SIB1-NB | D NSSS |
| | 4 | D NPBCH | S | U | U | D SIB1-NB | D NPSS | D | D | D | D NSSS |
| | 5 | D NPBCH | S | U | D | D SIB1-NB | D NPSS | D | D | D | D NSSS |
| | 6 | D NPBCH | S SIB1-NB-A | U | U | U | D NPSS | S SIB1-NB-B | U | U | D NSSS |

4.4. Fourth Proposal: "Transmit NPBCH in a Special Subframe of the Anchor Carrier"

As described above, the NPBCH is transmitted through QPSK modulation unlike NPSS and NSSS, which are composed of a combination of specific sequences, and accordingly the NPBCH may not need to be transmitted on consecutive OFDM symbols. However, in this case, an NRS for channel estimation may be transmitted within the interval of non-consecutive OFDM symbols. Further, considering that the TDD system is generally suitable for relatively narrow coverage compared to the FDD system, the code rate of the NPBCH may be designed to be higher than that of the NPBCH of LTE Rel.14 NB-IoT. In other words, in the TDD system, a new NPBCH channel structure or allocation method using a smaller number of OFDM symbols than the NPBCH of LTE Rel. 14 may be considered.

TABLE 14

| | | Subframe number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | D NPSS | S NPBCH-A | U | U | U | D NSSS | S NPBCH-B | U | U | U |
| | 1 | D NPSS | S NPBCH-A | U | U | D | D NSSS | S NPBCH-B | U | U | D |

TABLE 14-continued

| | Subframe number | | | | | | | | | |
|---|---|---|---|---|---|---|---|---|---|---|
| | 0 | 1 | 2 | 3 | 4 | 5 | 6 | 7 | 8 | 9 |
| 2 | D<br>NPSS | S<br>NPBCH-A | U | D | D | D<br>NSSS | S<br>NPBCH-B | U | D | D |
| 3 | D<br>NPSS | S<br>NPBCH-A | U | U | U | D<br>NSSS | D<br>NPBCH-B | D | D | D |
| 4 | D<br>NPSS | S<br>NPBCH-A | U | U | D | D<br>NSSS | D<br>NPBCH-B | D | D | D |
| 5 | D<br>NPSS | S<br>NPBCH-A | U | D | D | D<br>NSSS | D<br>NPBCH-B | D | D | D |
| 6 | D<br>NPSS | S<br>NPBCH-A | U | U | U | D<br>NSSS | S<br>NPBCH-B | U | U | D |

Table 14 shows an example in which NPSS, NSSS, and NPBCH are transmitted on the anchor-carrier in all UL/DL configurations. In this case, SIB1-NB may be transmitted on the second-anchor carrier as in the first proposal.

Subframes 0 and 5 are configured as fulldownlink subframes for all UL/DL configurations. Accordingly, the NPSS and NSSS may be transmitted in subframes 0 and 5, respectively, or may be transmitted in subframes 5 annual 0, respectively.

The NPBCH, which is modulated through QPSK and transmitted, may be divided into part-A and part-B as shown in Table 13 and transmitted in subframes 1 and 6. Alternatively, the payload size of the MIB may be reduced or the code rate may be increased to transmit the NPBCH in only one of subframe 1 or 6.

In the following description, it is assumed that the NPBCH is divided into part-A and part-B and transmitted.

In UL/DL configuration 3, 4, and 5, subframe 6 is configured as a fulldownlink subframe. However, in order to design the NPBCH structure irrespective of the UL/DL configurations, the NPBCH may be divided into part-A and part-B even in UL/DL configurations 3, 4, and 5 in the same manner as in the other UL/DL configurations.

If the NPBCH is configured to be transmitted only in subframe 6 in the case of UL/DL configurations 3, 4, and 5 without being divided into part-A and part-B, a method of "using a part of the 11 spare bits for the NPBCH" or "extending the table of NPBCH CRC masking" may be used to distinguish such configuration from NPBCH configurations for the other UL/DL subframes.

In order to divide the NPBCH into part-A and part-B to transmit NPBCH-A and NPBCH-B in the DwPTS of special subframes, the NB-IoT UE needs information about a DwPTS period for rate matching. Thus, in a manner similar to the second proposal described above, the eNB may provide related information to the NB-IoT UE by "using a part of the 11 spare bits for the NPBCH" or "extending the table of NPBCH CRC masking."

Alternatively, the SIB1-NB and NSSS may be transmitted in subframe 9 alternately every 10 msec.

4.5. Fifth Proposal: "Transmit NSSS and SIB1-NB Through Time Multiplexing"

Unlike the NPSS and NPBCH, the NSSS and SIB1-NB may not be transmitted in every radio frame. More specifically, the NSSS may be configured to be transmitted once every 2 msec, and the SIB1-NB may be configured to be transmitted once every 2 msec or not to be transmitted for several msec according to the repetition number and $N_{ID}^{N}$-cell.

Hereinafter, a method of time-multiplexing NSSS and SIB1-NB on a radio frame basis will be described in detail based on the features of the NSSS and SIB1-NB whose discontinuous transmission is allowed as described above.

The described time multiplexing method may be defined separately from the subframe positions of the NPSS and NPBCH, and may be used even when the NPSS and NPBCH are configured as shown in Table 13 or 14. In this section, for simplicity, the proposed time multiplexing method will be described in more detail based on Table 15, which is a modification of Table 14.

TABLE 15

| | | Subframe number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | D<br>NPSS | S<br>NPBCH-A | U | U | U | D<br>SIB1-NB/NSSS | S<br>NPBCH-B | U | U | U |
| | 1 | D<br>NPSS | S<br>NPBCH-A | U | U | D | D<br>SIB1-NB/NSSS | S<br>NPBCH-B | U | U | D |
| | 2 | D<br>NPSS | S<br>NPBCH-A | U | D | D | D<br>SIB1-NB/NSSS | S<br>NPBCH-B | U | D | D |
| | 3 | D<br>NPSS | S<br>NPBCH-A | U | U | U | D<br>SIB1-NB/NSSS | D<br>NPBCH-B | D | D | D |
| | 4 | D<br>NPSS | S<br>NPBCH-A | U | U | D | D<br>SIB1-NB/NSSS | D<br>NPBCH-B | D | D | D |
| | 5 | D<br>NPSS | S<br>NPBCH-A | U | D | D | D<br>SIB1-NB/NSSS | D<br>NPBCH-B | D | D | D |
| | 6 | D<br>NPSS | S<br>NPBCH-A | U | U | U | D<br>SIB1-NB/NSSS | S<br>NPBCH-B | U | U | D |

In Table 15, the NSSS may be transmitted in subframe 5 of every odd-numbered (or even-numbered) radio frame, and the SIB1-NB may be transmitted in every even-numbered (or odd-numbered) radio frame within consecutive radio frames of 160 msec in order to avoid collision with the NSSS. Here, transmitting the SIB1-NB in a continuous period of 160 msec may mean that the same SIB1-NB may be repeatedly transmitted at regular intervals within 160 msec.

Here, if the repetition number is 16, the SIB1-NB may be transmitted in odd-numbered radio frames when the condition of $N_{ID}^{Ncell}$ mod 2=1 is satisfied. In this case, if the repetition number is 16, the SIB1-NB may fail to avoid collision with the NSSS. Considering that the TDD system is suitable for relatively narrow bandwidth compared to the FDD system, a constraint may be configured such that 16 is not used as the repetition number of the SIB1-NB.

As a more specific embodiment, repetition numbers according to the frame structure types as shown in the table below may be proposed. In this case, in order to avoid collision with the SIB1-NB, the NSSS may be transmitted in subframe 5 of every odd-numbered radio frame.

TABLE 16

| Frame structure type | Number of NPDSCH repetitions | $N_{ID}^{Ncell}$ | Starting radio frame number for NB-SIB1 repetitions (nf mod 256) |
|---|---|---|---|
| 1 and 2 | 4 | $N_{ID}^{Ncell}$ mod 4 = 0 | 0 |
| 1 and 2 |   | $N_{ID}^{Ncell}$ mod 4 = 1 | 16 |
| 1 and 2 |   | $N_{ID}^{Ncell}$ mod 4 = 2 | 32 |
| 1 and 2 |   | $N_{ID}^{Ncell}$ mod 4 = 3 | 48 |
| 1 and 2 | 8 | $N_{ID}^{Ncell}$ mod 2 = 0 | 0 |
| 1 and 2 |   | $N_{ID}^{Ncell}$ mod 2 = 1 | 16 |
| 1 | 16 | $N_{ID}^{Ncell}$ mod 2 = 0 | 0 |
| 1 |   | $N_{ID}^{Ncell}$ mod 2 = 1 | 1 |

Figure 19:
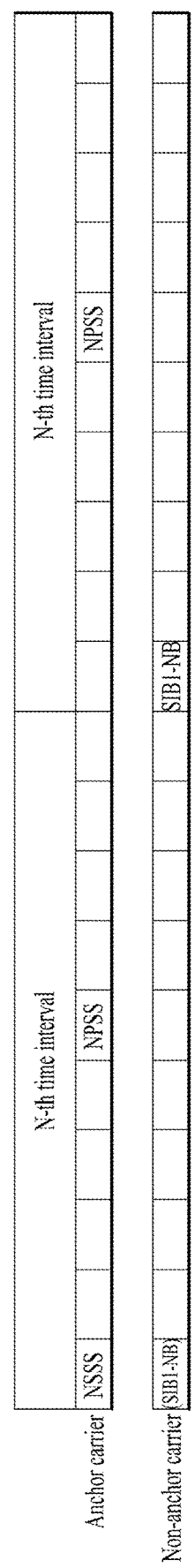
FIG. 19 is a diagram schematically illustrating a signal transmission/reception method between a terminal and a base station according to the present invention.

FIG. 19 is a diagram schematically illustrating a signal transmission/reception method between a UE and a BS according to the present invention.

As shown in FIG. 19, a UE receives NPSS, NSSS, and the like through a first carrier (e.g., an anchor carrier) and receives SIB1-NB through a second carrier (e.g., a non-anchor carrier).

In this case, as shown in FIG. 19, the UE may receive the NPSS through the first carrier in an X-th (e.g., X=6) sub-time interval in every time interval, and may receive the NSSS through the first carrier in a Y-th (e.g., Y=1) sub-time interval in a corresponding time interval (e.g., an N-th time interval) with a periodicity of two time intervals. Next, when the MIB-NB included in the received PBCH indicates that the SIB1-NB is transmitted through the second carrier, the UE may receive the SIB1-NB through the second carrier in the Y-th (e.g., Y=1) sub-time interval in a corresponding time interval with a periodicity of one or more time intervals.

As a specific example, in the case where the SIB1-NB is transmitted with a periodicity of one time interval, the SIB1-NB may be transmitted through the second carrier in an 1-th sub-time interval of the N-th time interval and an 1-th sub-time interval of the (N+1)-th time interval.

Alternatively, in the case where the SIB1-NB is transmitted with a periodicity of 2 or 4 time intervals, the SIB1-NB may be transmitted through the second carrier during the Y-th sub-time interval in a time interval in which the NSSS is not transmitted.

With this configuration, the UE may receive the SIB1-NB without collision with another signal (e.g., NSSS).

As an example applicable to the present invention, when the UE operates in the LTE TDD system, one time period described above may correspond to one radio frame of the LTE TDD system, and one sub-time interval may correspond to one subframe of the LTE TDD system.

As another example, when the UE operates in the LTE TDD system, the LTE TDD system may not support UL/DL configuration 0 for one radio frame defined in the LTE system in order to support the NB IoT operation. In this case, UL/DL configuration 0 for one radio frame may correspond to "Uplink/Downlink configuration 0" in Table 10.

As an operation corresponding to the operation of the UE described above, the BS may transmit the NPSS through the first carrier in the X-th (where X is, for example, 6) sub-time interval of every time interval, and transmit the NSSS through the first carrier in the Y-th (e.g., Y=1) sub-time interval in a corresponding time interval (e.g., the N-th time interval) with a periodicity of 2 time intervals. If the MIB-NB included in the received PBCH indicates that the SIB1-NB is transmitted on the second carrier, the BS may transmit the SIB1-NB on the second carrier in the Y-th (e.g., Y=1) sub-time interval in a corresponding time interval with a periodicity of one or more time intervals.

Since examples of the above-described proposal method may also be included in one of implementation methods of the present invention, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

5. Device Configuration

Figure 20:
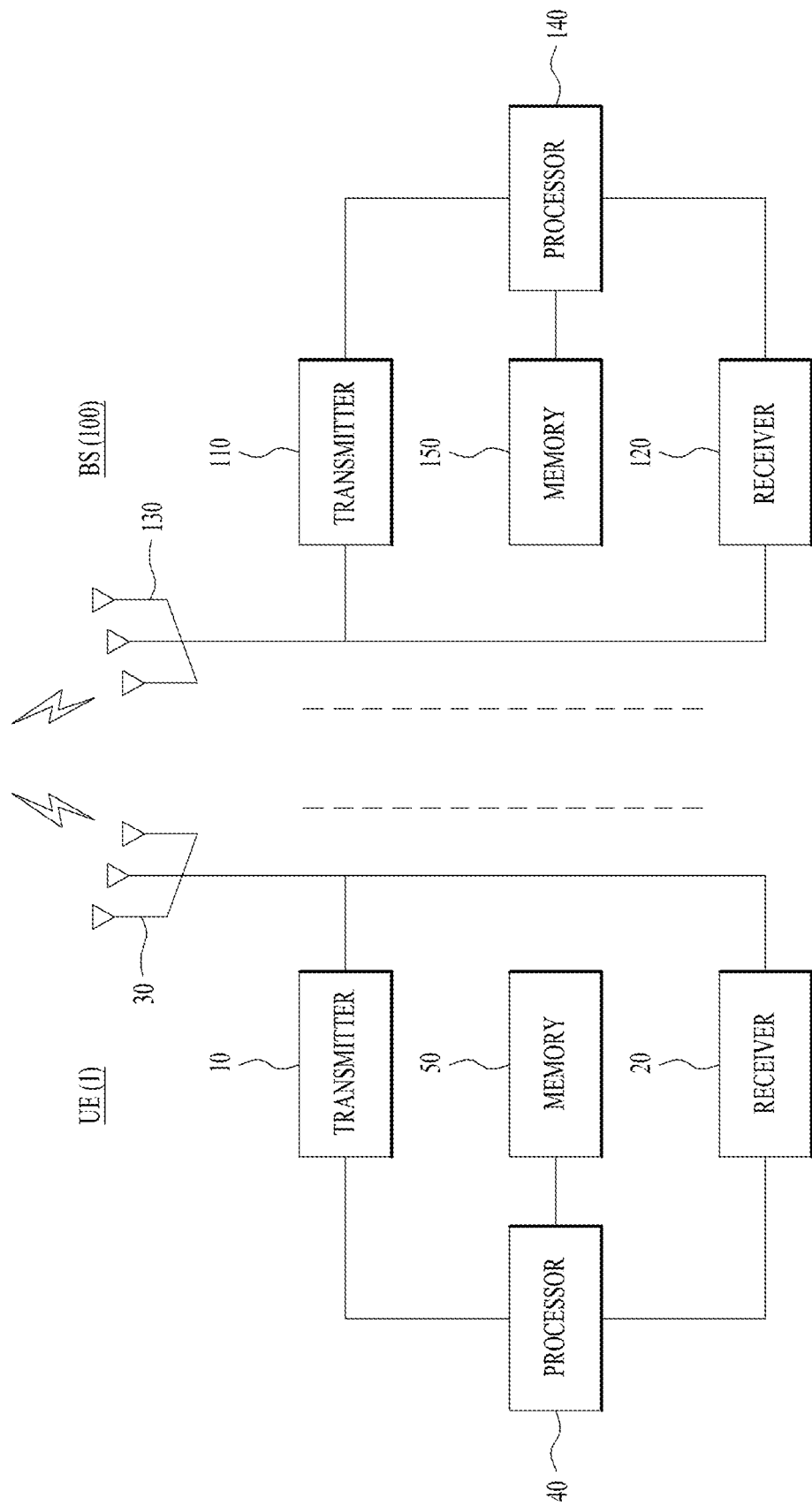
FIG. 20 is a diagram showing configuration of a terminal and a base station in which the proposed embodiments are implementable.

FIG. 20 is a diagram illustrating construction of a UE and a base station in which proposed embodiments can be implemented. The UE and the base station shown in FIG. 20 operate to implement the above-described embodiments of the signal transmission/reception method between the UE and the base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured as described above receives NPSS, NSSS, SIB1-NB, and the like through the receiver 20. In this operation, the UE 1 may receive the NPSS and NSSS through a first carrier (e.g., the anchor carrier) and receive the SIB1-NB through a second carrier (e.g., the non-anchor carrier). For example, as shown in FIG. 19, if the NSSS is received in an 1-th sub-time interval in an N-th time interval, the SIB1-NB may be received in the 1-th sub-time interval in the N+1-th (or N+3-th) time interval.

As a corresponding operation, the base station 100 transmits NPSS, NSSS, SIB1-NB, and the like through the transmitter 110. In this operation, the best station 100 may transmit the NPSS and NSSS through the first carrier (e.g., the anchor carrier) and transmit the SIB1-NB through the second carrier (e.g., the non-anchor carrier). For example, as shown in FIG. 19, if the NSSS is transmitted in an 1-th sub-time interval in an N-th time interval, the SIB1-NB may be transmitted in the 1-th sub-time interval in the N+1-th (or N+3-th) time interval.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment operating in a wireless communication system, the method comprising:
    receiving a narrowband primary synchronization signal (NPSS), a narrowband secondary synchronization signal (NSSS), a narrowband physical broadcast channel (NPBCH), and a system information block 1-narrowband (SIB1-NB) via a plurality of radio frames; and
    performing operations based on synchronization signals including the NPSS and the NSSS and system information including the SIB1-NB,
    wherein each of the plurality of radio frames comprises 10 subframes,
    wherein the NPSS is received on subframe #L in each of the plurality of radio frames,
    wherein the NSSS is received on subframe #N in each of radio frames having even-numbered index among the plurality of radio frames,
    wherein the NPBCH is received on subframe #K in each of the plurality of radio frames,
    wherein the NPBCH includes master information block-narrowband (MIB-NB),
    wherein the SIB1-NB is received on the subframe #N in at least one radio frame having odd-numbered index among the plurality of radio frames,
    wherein N and L are integers, and a difference value between N and L is 5, and
    wherein K is an integer different from N and L.

2. The method of claim 1, wherein the at least one radio frame is determined based on a number of narrowband physical downlink shared channel (NPDSCH) repetitions and cell identifier related to the SIB1-NB.

3. The method of claim 1, wherein the subframe #N where the NSSS is received is adjacent to the subframe #K where the MIB-NB is received.

4. The method of claim 1, wherein the 10 subframes included in the each of the plurality of radio frames are indexed from subframe #0 to subframe #9.

5. The method of claim 1, wherein the wireless communication system is a time division duplex (TDD) system.

6. The method of claim 1, wherein the NSSS and the SIB1-NB is received via an identical subcarrier.

7. A communication device configured to receive signals from a base station in a wireless communication system, the communication device comprising:
    a transceiver;
    a memory; and a processor operably coupled with the memory and storing instructions that, based on being executed by the processor, perform operations comprising:

receiving, via the transceiver, a narrowband primary synchronization signal (NPSS), a narrowband secondary synchronization signal (NSSS), a narrowband physical broadcast channel (NPBCH), and a system information block 1-narrowband (SIB1-NB) via a plurality of radio frames; and performing operations based on synchronization signals including the NPSS and the NSSS and system information including the SIB1-NB, wherein each of the plurality of radio frames comprises 10 subframes, wherein the NPSS is received on subframe #L in each of the plurality of radio frames, wherein the NSSS is received on subframe #N in each of radio frames having even-numbered index among the plurality of radio frames, wherein the NPBCH is received on subframe #K in each of the plurality of radio frames, wherein the NPBCH includes master information block-narrowband (MIB-NB), wherein the SIB1-NB is received on the subframe #N in at least one radio frame having odd-numbered index among the plurality of radio frames, wherein N and L are integers, and a difference value between N and L is 5, and wherein K is an integer different from N and L.

8. The communication device of claim 7, wherein the communication device communicates with at least one of a mobile terminal, a network and an autonomous vehicle.

9. A communication device configured to transmit signals to a user equipment in a wireless communication system, the communication device comprising:

a transceiver;

a memory; and a processor operably coupled with the memory and storing instructions that, based on being executed by the processor, perform operations comprising:

transmitting, via the transceiver, a narrowband primary synchronization signal (NPSS), a narrowband secondary synchronization signal (NSSS), a narrowband physical broadcast channel (NPBCH), and a system information block 1-narrowband (SIB1-NB) via a plurality of radio frames, wherein each of the plurality of radio frames comprises 10 subframes, wherein the NPSS is transmitted on subframe #L in each of the plurality of radio frames, wherein the NSSS is transmitted on subframe #N in each of radio frames having even-numbered index among the plurality of radio frames, wherein the NPBCH is transmitted on subframe #K in each of the plurality of radio frames, wherein the NPBCH includes master information block-narrowband (MIB-NB), wherein the SIB1-NB is transmitted on the subframe #N in at least one radio frame having odd-numbered index among the plurality of radio frames, wherein N and L are integers, and a difference value between N and L is 5, and wherein K is an integer different from N and L.

10. The communication device of claim 9, wherein the at least one radio frame is determined based on a number of narrowband physical downlink shared channel (NPDSCH) repetitions and cell identifier related to the SIB1-NB.

11. The communication device of claim 9, wherein the subframe #N where the NSSS is transmitted is adjacent to the subframe #K where the MIB-NB is transmitted.

12. The communication device of claim 9, wherein the 10 subframes included in the each of the plurality of radio frames are indexed from subframe #0 to subframe #9.

13. The communication device of claim 9, wherein the wireless communication system is a time division duplex (TDD) system.

14. The communication device of claim 9, wherein the NSSS and the SIB1-NB is transmitted via an identical subcarrier.

* * * * *